United States Patent
Arnold et al.

(10) Patent No.: US 6,745,161 B1
(45) Date of Patent: Jun. 1, 2004

(54) SYSTEM AND METHOD FOR INCORPORATING CONCEPT-BASED RETRIEVAL WITHIN BOOLEAN SEARCH ENGINES

(75) Inventors: James F. Arnold, Helena, MT (US); Loren L. Voss, Helena, MT (US)

(73) Assignee: Discern Communications, Inc., Menlo Park, CA (US)

( * ) Notice: Subject to any disclaimer, the term of this patent is extended or adjusted under 35 U.S.C. 154(b) by 367 days.

(21) Appl. No.: 09/613,237

(22) Filed: Jul. 10, 2000

Related U.S. Application Data

(63) Continuation-in-part of application No. 09/398,233, filed on Sep. 17, 1999.

(51) Int. Cl.$^7$ .............................................. G06F 17/27
(52) U.S. Cl. .............................................. 704/7; 704/9
(58) Field of Search .............................. 704/9; 707/1–6

(56) References Cited

U.S. PATENT DOCUMENTS

| | | | |
|---|---|---|---|
| 5,434,777 A | 7/1995 | Luciw | 364/419.13 |
| 5,742,816 A | 4/1998 | Barr et al. | 395/615 |
| 5,748,974 A | 5/1998 | Johnson | 395/759 |
| 5,895,464 A | 4/1999 | Bhandari et al. | 707/3 |

FOREIGN PATENT DOCUMENTS

| | | | |
|---|---|---|---|
| EP | 0 609 517 | 8/1994 | G06F/15/403 |
| EP | 0 747 881 | 12/1996 | G01L/7/10 |
| EP | 0 895 396 | 2/1999 | H04M/3/50 |

OTHER PUBLICATIONS

Cowie et al., "Information Extraction," Communications of the ACM, Jan. 1996, vol. 39, No. 1, pp. 80–91.*

Kushmerick, "Gleaning the Web," IEEE Intelligent Systems, Mar./Apr. 1999, pp. 20–22.*

"Using Information Extraction to Improve Document Retrieval", John Bear, et al., Proceedings of the Sixth Text Retrieval Conference, Gathiersburg, MD, Nov. 1997, published Jan. 9, 1998.

"FASTUS: A Cascaded Finite–State Transducer For Extracting Information from Natural–Language Text", Jerry R. Hobbs, et al., Finite State Devices for Natural Language Processing, MIT Press, 1996.

"SRI International Fastus System MUC–6 Test Results and Analysis", Douglas E. Appelt, et al., Proceedings of the Sixth Message Understanding Conference, Columbia, MD 1995.

"FASTUS: A Finite–state Processor for Information Extraction" Real–world Text, Douglas E. Appelt, et al., Real–World Text, in Proceedings of IJCAI–93, Chambery, France, Sep. 1993.

Copy of International Search Report dated Nov. 21, 2003 for corresponding PCT application, PCT/US00/25346.

* cited by examiner

*Primary Examiner*—Richemond Dorvil
*Assistant Examiner*—V. Paul Harper
(74) *Attorney, Agent, or Firm*—Moser, Patterson & Sheridan, LLP; Kin-Wah Tong, Esq.

(57) ABSTRACT

Disclosed is a method for linguistic pattern recognition of information. Initially, textual information is retrieved from a data source utilizing a network. The textual information is then segmented into a plurality of phrases, which are then scanned for patterns of interest. For each pattern of interest found a corresponding event structure is built. Event structures that provide information about essentially the same incident are then merged.

12 Claims, 22 Drawing Sheets

FastFacts! Demo
Rapid information access for specialized fields of science and business Ask FastFacts! A question:                                      ┌─ 1700
| Tell me about joint ventures involving SBC in the Communications Services Services. |
Do it!
Example:    Did Barnes & Noble buy anyone this year?

If you prefer a menu-driven approach, please use this alternate interface to specify your query.

☞ *Let me show you all of the references generated by your query...*   ┌─ 1702
☞ *Let me show you the response from Ask Jeeves$^{SM}$ to the same question...*   ┌─ 1704

| Joint Ventures involving Telefonos de Mexico S.A. de C.V. and SBC Communications Inc. |

┌─ 1706
| New York Times, Fri, 14 May 1999 13:21:59 PDT: ... The announcement also noted that SBC had formed a joint venture with Telefonos de Mexico S.A. de C.V. ('Telmex') to effect the acquisition... |

The material contained in this page is confidential and proprietary to SRI International and may not be reproduced, published, or disclosed to others without authorization from SRI International.
Ask Jeeves is a trademark of Ask Jeeves, Inc.. Copyright 1996-1999 Ask Jeeves, Inc.
(C)    SRI International 1999

FIG. 17

FastFacts! Demo
Rapid information access for specialized fields of science and business

---

Copyright 1999 by PR Newswire (via ClariNet), Fri, 14 May 1999 13:21:59 PDT

Cellular Communications of Puerto Rico, Inc.
Organization:Copyright 1999 by PR Newswire (via ClariNet)
Message-ID:
Lines:127  ⟵ 1706
Date:Fri, 14 May 1999 13:21:59 POT
Location:Puerto Rico
ACategory:financial
Slugword:CLRP-first-qtr-result
Threadword:     clrp
Priority:regular
Approved:e . news@clari. net
Xref:news.sri.com clari.biz.earnings.releases:96509 clari.tw.telecom.releases:61084

NEW YORK, May 14 /PRNewswire/ -- Cellular Communications of Puerto Rico, Inc. (Nasdaq: CLRP) (the "Company") announced today operating results for the three months ended March 31, 1999.

Record EBITDA at CCPR
At CCPR, Inc. ("CCPR"), the Company's wholly-owned subsidiary operating in Puerto Rico and the U.S. Virgin Islands, EBITDA (Earnings before Interest, Taxes, Depreciation and Amortization) increased to a record $21.1 million for the first quarter of 1999 versus $14.6 million for the first quarter of 1998. KBITDA as a percentage of service revenues was 51.7% in the first quarter of 1999 versus 42.3% in the first quarter of 1998.
Cellular subscribers increased by 120,700 to 332,600 as of March 31, 1999, a 57% increase over the 211,900 subscribers reported as of March 31, 1998.
CLRP's KBITDA after corporate overhead was $20.7 million for the first quarter of 1999 versus $14.1 million for the first quarter of 1998.

CLRP to be Acquired
On May 3, 1999, the Company announced that it had entered into an  ⟵ 1800
agreement with SBC Communications Inc. ("SBC") under which it would be
acquired in a transaction valued at $29.50 per outstanding share. The
annoucement also noted that SBC had formed a joint venture with Telefonos de Mexico S.A. de C.V. ("Telmex") to effect the acquisition.
SBC and Telmex through the joint venture will pay shareholders $29.50 per share and assume the outstanding debt of the Company. The companies aim to complete the merger by late third quarter, pending a vote by the Company's shareholders and regulatory approvals.

| Financial Highlights | | Three Months Ended March 31 |
|---|---|---|
| | | 1999    1998 |
| | | In thousands, except for subscriber data |
| CCPR Revenues: | FIG. 18 | |

SYSTEM AND METHOD FOR INCORPORATING CONCEPT-BASED RETRIEVAL WITHIN BOOLEAN SEARCH ENGINES

RELATED APPLICATION(S)

This is a continuation-in-part of a co-pending application filed on Sep. 17, 1999 under Ser. No. 09/398,233.

BACKGROUND OF THE INVENTION

The present invention relates to Internet based information retrieval. More particularly, the present invention relates to systems and methods for concept-based Internet searching.

The Web has blossomed as a means of access to a variety of information by remote individuals. The Web is an open system in that virtually any individual or organization with a computer connected to a telephone line may use the Web to present information concerning almost any subject. To accomplish this, the Web utilizes a body of software, a set of protocols, and a set of defined conventions for presenting and providing information over the Web. Hypertext and multimedia techniques allow users to gain access to information available via the Web.

Users typically operate personal computers (PC's) executing browser software to access information stored by an information provider computer. The user's computer is commonly referred to as a client, and the information provider computer is commonly referred to as a Web server. The browser software executing on the user's computer requests information from Web servers using a defined protocol. One protocol by which the browser software specifies information for retrieval and display from a Web server is known as Hypertext Transfer Protocol (HTTP). HTTP is used by the Web server and the browser software executing on the user's computer to communicate over the Internet.

Web servers often operate using the UNIX operating system, or some variant of the UNIX operating system. Web servers transmit information requested by the browser software to the user's computer. The browser software displays this information on the user's computer display in the form of a Web page. The Web page may display a variety of text and graphic materials, and may include links that provide for the display of additional Web pages. A group of Web pages provided by a common entity, and generally through a common Web server, form a Web site.

A specific location of information on the Internet is designated by a Uniform Resource Locator (URL). A URL is a string expression representing a location identifier on the Internet or on a local Transmission Control Protocol/Internet Protocol (TCP/IP) computer system. The location identifier generally specifies the location of a server on the Internet, the directory on the server where specific files containing information are found, and the names of the specific files containing information. Certain default rules apply so that the specific file names, and even the directory containing the specific files, need not be specified. Thus, if a user knows that specific information desired by the user is located at a location pointed to by a URL, the user may enter the URL on the user's computer in conjunction with execution of the browser software to obtain the desired information from a particular Web server. Users, or the browser software executing on the user's computer, must always at a minimum know the Internet address portion of the URL for a particular Web server.

However, often the user does not know the URL of a site containing desired information. Even if the user once knew the proper URL, the user may have forgotten, mistyped, or otherwise garbled a URL for a specific location, as URL's can often be lengthy strings with a variety of special characters. To allow increased ease in locating Web sites containing desired information, search engines identifying Web sites likely to contain the desired information are widely available. A search engine using a well constructed search may often very quickly allow a user to quickly and accurately locate Web sites with desired information. Due to the multiplicity of Web sites, and indeed due to the unstructured nature of the Web, a poorly constructed search may make locating a Web site with the desired information virtually impossible.

An inability of a user to quickly and easily locate a Web site poses difficulties with respect to some commercial uses of the Web. Commercial entities have found the Web a useful medium for the advertisement and sale of goods and services. A variety of commercial entities have created home pages for the commercial entity as a whole, and for particular products sold and marketed by the commercial entity. The effectiveness of advertising in such a way on the Web is dependent on users accessing a commercial entity's Web site and viewing the information located there. The user must undertake two critical actions for this to occur. The user must first access a commercial entity's Web site, and then the user must actually view the material displayed there. A user who desires to view a Web page advertising or selling a particular product, but who is a poor Web searcher, may represent a lost sale of the product.

The huge amounts of poorly accessible information frustrate consumers, analysts and content providers alike. Existing navigation devices often fail to connect people and content, limiting the growth of Web-based information services and e-commerce.

What is needed is an improved method that allows a user to easily obtain information via the Web. The method should allow a user to use natural language, and search based on idea concepts, rather than strict Boolean strings.

SUMMARY OF THE INVENTION

The present invention addresses these needs by providing a system, method and article of manufacture for concept-based information selection. The raw text of information is retrieved from various sources on a network, such as thee Internet, and compiled. Preferably, the information retrieval and compilation is performed continuously. The text is parsed into components such as by identifying an event, a time, a location, and/or a participant associated with information in the text. Elements of information are extracted from the components and cataloged. The cataloged information is matched with user-specific parameters.

In one embodiment of the present invention, the user-specific parameters are extracted from a user query. Preferably, the user query is entered in natural language. In another embodiment of the present invention, the matched information is routed to an information cache specific to a user so that the user can retrieve the information for viewing. Preferably, the text is parsed into components by identifying at least one of an event, a time, a location, and a participant associated with information in the text.

According to another embodiment of the present invention, a system, method and article of manufacture are provided for incorporating concept-based retrieval within Boolean search engines. Initially, textual information is retrieved from a data source utilizing a network. The textual information is then segmented into a plurality of phrases, which are then scanned for patterns of interest. For each pattern of interest found a corresponding event structure is built. Event structures that provide information about essentially the same incident are then merged.

In one embodiment of the present invention, at least one phrase includes a noun group. Optionally, at least one phrase includes a verb group. In a further embodiment, a user interface is provided that allows a user to provide the search request. Further, the merged event structures may be stored in an information cache for later retrieval.

According to yet another embodiment of the present invention, a system, method and article of manufacture are provided for allowing concept based information searching according to one embodiment of the present invention. Textual information from various sources is collected utilizing a network. The textual information is parsed to create topic specific information packets, which are stored in an information cache. A query is received from a user, which, as mentioned above, may be input in natural language. The information packets in the information cache are matched with the user query. Matching information packets are formatted for display to a user and output.

In one embodiment of the present invention, the query is converted into an internal query form that is used to find matching information in the information cache. In another embodiment of the present invention, if the user query is not understood, a network search engine is executed and used to perform a search of information sources utilizing the user query. Information matching the user query is output to the user. In yet another embodiment of the present invention, the formatted information includes a hyperlink to the original source of the textual information.

Advantageously, the present invention efficiently connects people and content, by providing answers to user's questions on large collections of dynamic, free-text information.

The present invention provides some dramatic benefits to a range of applications. As a web site tool, the present invention provides single-step, question & answer searches for information, very high precision information retrieval, and smooth migration of search to wireless PDAs, wireless phones, and other small devices.

In addition, the present invention can provide custom news services and automated information routing. In this mode, users post persistent queries, that is, long-standing information requests that the system continuously monitors and satisfies as new sources provide relevant information.

Further, as an information router, the present invention provides real-time monitoring of news, automated alerts to business intelligence and marketing staffs, and when combined with Open Agent Architecture (OAA) technology, the present invention provides news summaries through multiple modalities, such as e-mail, speech, or custom Web homepages.

BRIEF DESCRIPTION OF THE DRAWINGS

The invention together with further advantages thereof may best be understood with reference the following drawings in which:

FIGS. 17 and 18 are exemplary outputs by the system of FIG. 11;

DETAILED DESCRIPTION OF THE INVENTION

The present invention provides interactive question-answering and automated information routing on large collections of free-text information, including news feeds, Web pages, recognized speech, and corporate documents. For example, a user may ask the question, "Who did AOL buy in 1999?" In response, the present invention generates the direct response, "AOL acquired Netscape in 1999," and provides the relevant quote, along with a citation to the source text used to answer the question. Everything is automatic: no manually prepared answers are required.

Figure 1:
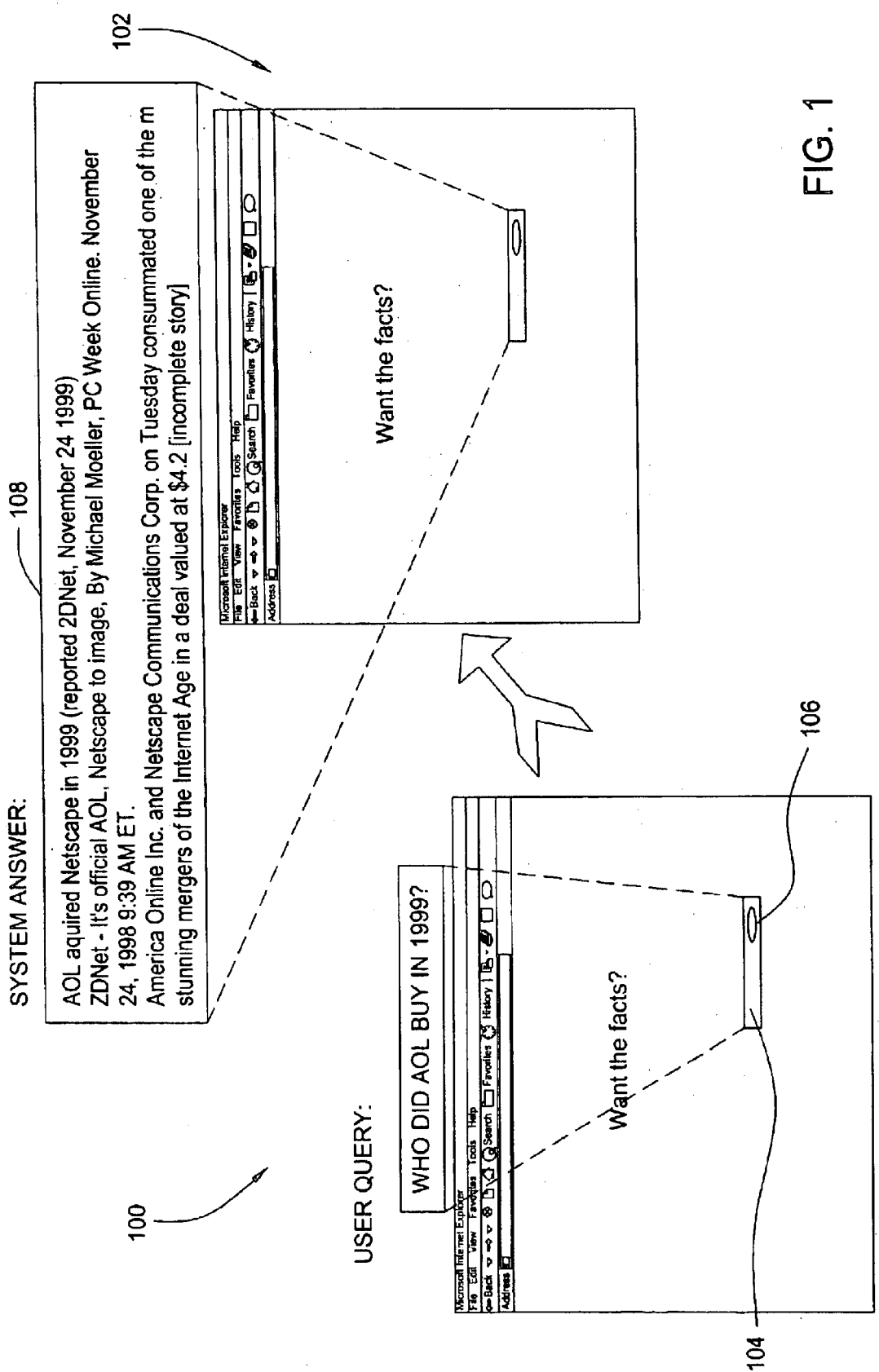
FIG. 1 depicts an illustrative query input page and an answer page according to one embodiment of the present invention.

FIG. 1 depicts an illustrative query input page 100 and an answer page 102. The user simply inputs a query in a query entry field 104 and selects a submit button 106. The answer 108 is displayed on the answer page 102.

Figure 2:
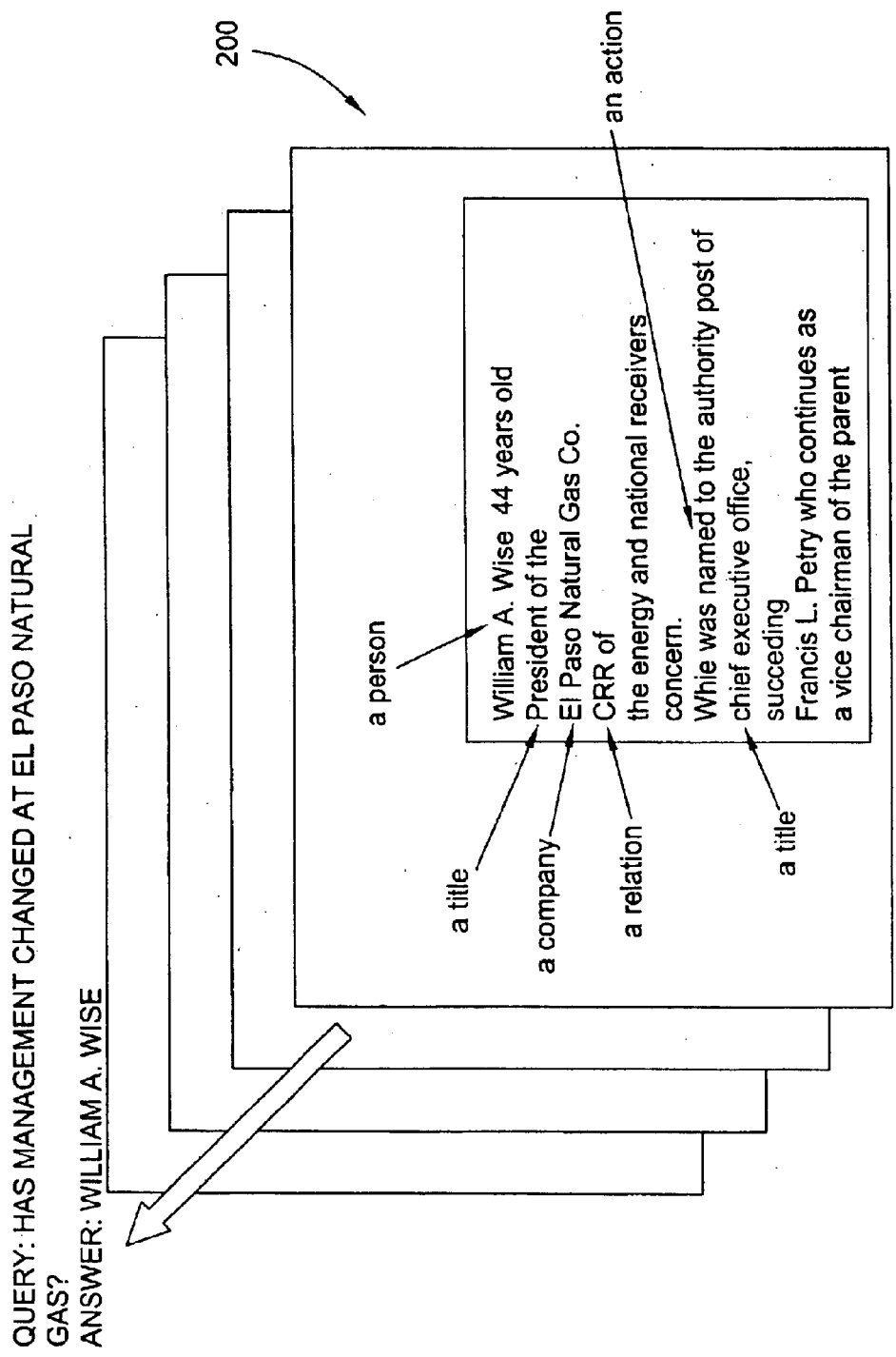
FIG. 2 illustrates an organization of information extracted from a network data source according to an embodiment of the present invention.

An embodiment of the present invention parses documents to identify topics—events and relationships of interest, and objects—the people, organizations, and locations involved. FIG. 2 illustrates how the extracted information 200 is organized to facilitate answering natural language questions.

The present invention continuously compiles the raw text of news sources and the Internet into an efficiently accessible information cache. This process is powered by an information extraction engine that works through a combination of structural models of human language and contextual information regarding specific topics.

As discussed in greater detail subsequently, the present invention uses an information extraction engine, which parses English text into its constituent meaningful components, extracting and cataloging the key elements of information. The system identifies topics: the key events, their times and locations, as well as their participants and their relationships among them. This extraction of meaning from text enables information to be retrieved or routed by concept. The very high precision of this technique enables both direct answers to users' questions, as well as highly reliable subdocument retrieval and routing.

This same natural language understanding capability also powers the user interface. In this case, the meaning of user's questions or information interest profiles are understood, and converted to an internal query format.

The present invention supports both interactive question answering and automated news routing, as described below.

Figure 3:
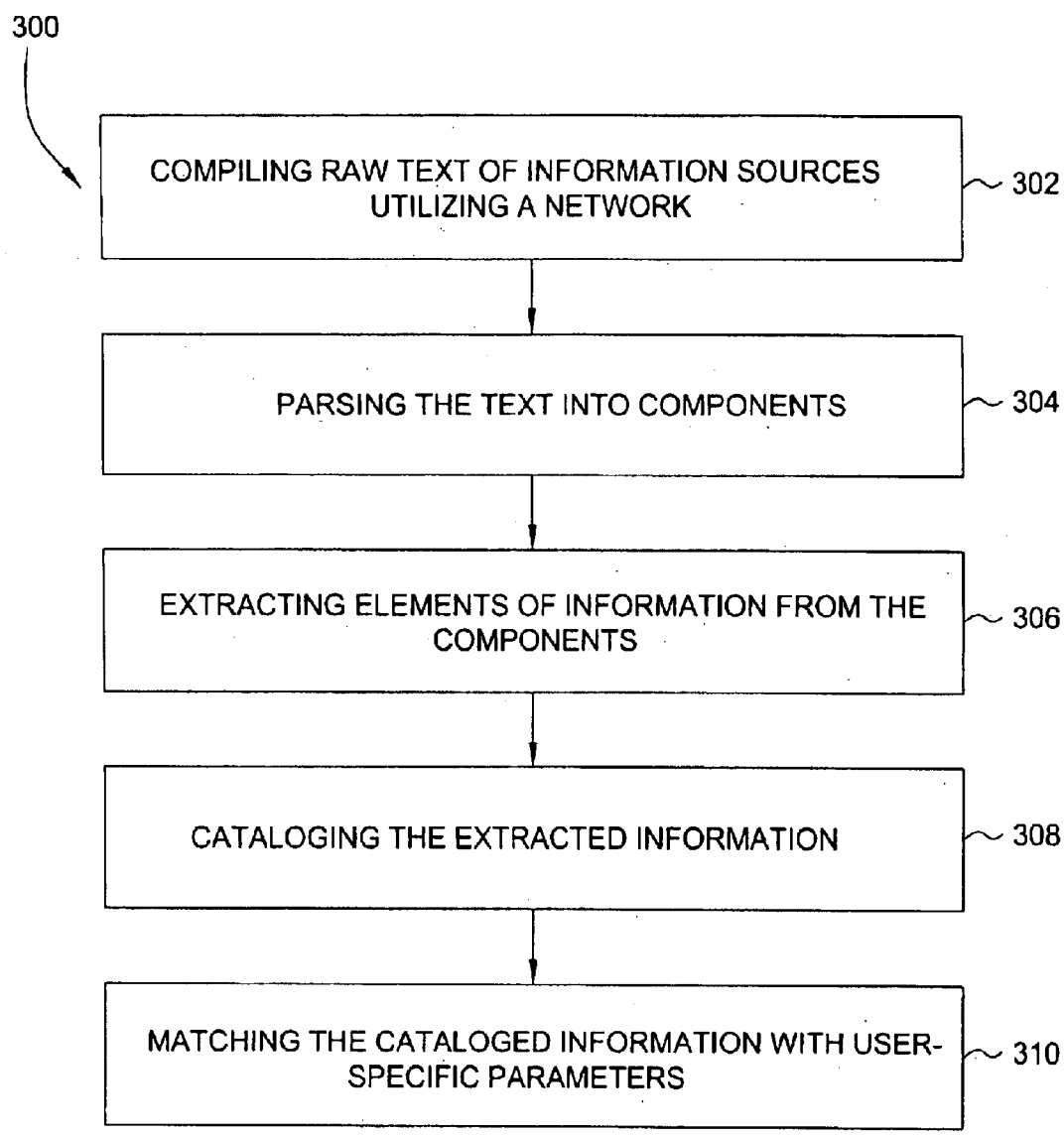
FIG. 3 depicts a process for concept-based information selection in accordance with one embodiment of the present invention.

FIG. 3 depicts a process 300 for concept-based information selection. The raw text of information is retrieved from various sources on a network, such as the Internet, and compiled in operation 302. Preferably, the information retrieval and compilation is performed continuously. In operation 304, the text is parsed into components such as by identifying an event, a time, a location, and/or a participant associated with information in the text. Elements of information are extracted from the components in operation 306 and cataloged in operation 308. In operation 310, the cataloged information is matched with user-specific parameters.

In one embodiment of the present invention, the user-specific parameters are extracted from a user query. Preferably, the user query is entered in natural language.

In another embodiment of the present invention, the matched information is routed to an information cache specific to a user so that the user can retrieve the information for viewing. Preferably, the text is parsed into components by identifying an event, a time, a location, and/or a participant associated with information in the text.

Figure 4:
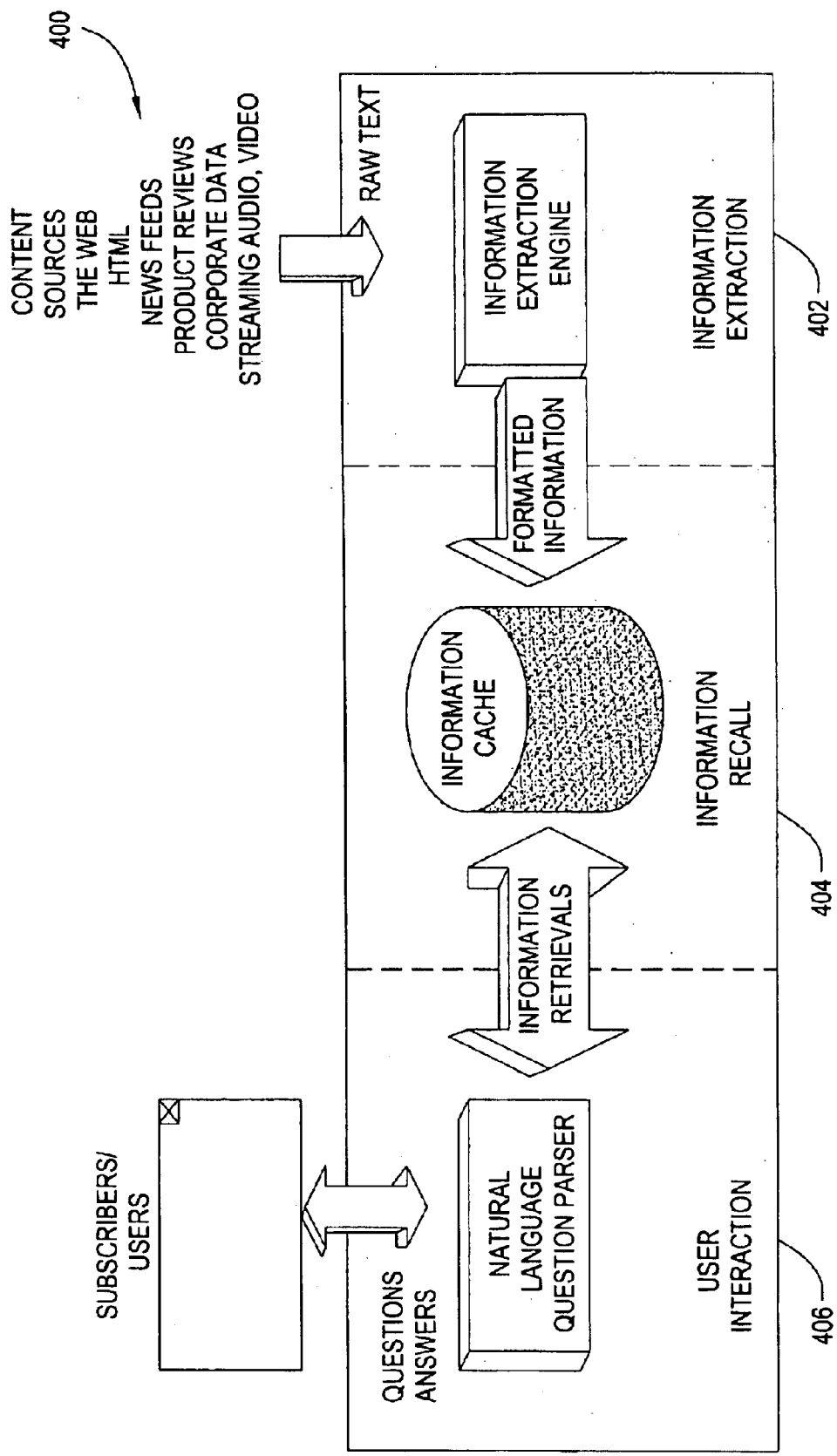
FIG. 4 is an illustration showing a question-answer architecture, in accordance with an embodiment of the present invention.

FIG. 4 is an illustration showing a system architecture 400 that allows conducting question-answer session, in accordance with an embodiment of the present invention. See also the discussion below with respect to FIG. 9 for a description of process for allowing concept based information searching and retrieval. The question-answering architecture 400 includes an information extraction module 402, an information recall module 404, and a user interaction module 406.

The Information Extraction (IE) Module 402 collects and processes text and other information from Web sources, which may include html pages gathered by a Web crawler, news feeds, recognized speech on video or audio tracks, and internal corporate documents. The IE engine 402 parses this text through a collection of preset grammars to create topic-specific information packets.

The Information Recall Module 404 powers the concept-based retrieval process. Information may be loaded from the IE module 402 and, in e-commerce applications, from product databases as well.

The User Interaction Module 406 enables natural language-based interaction between a user's and the system's information store. Components include a Java Servlet-enabled Web browser, a natural language question parser, an information recall interface, and an English text generation module to create answers in response to user questions.

The present invention can also provide automated information discovery and routing. The primary difference between Q&A and routing applications is that the user questions are posted as persistent queries that are continuously tested against new data as it becomes available.

Figure 5:
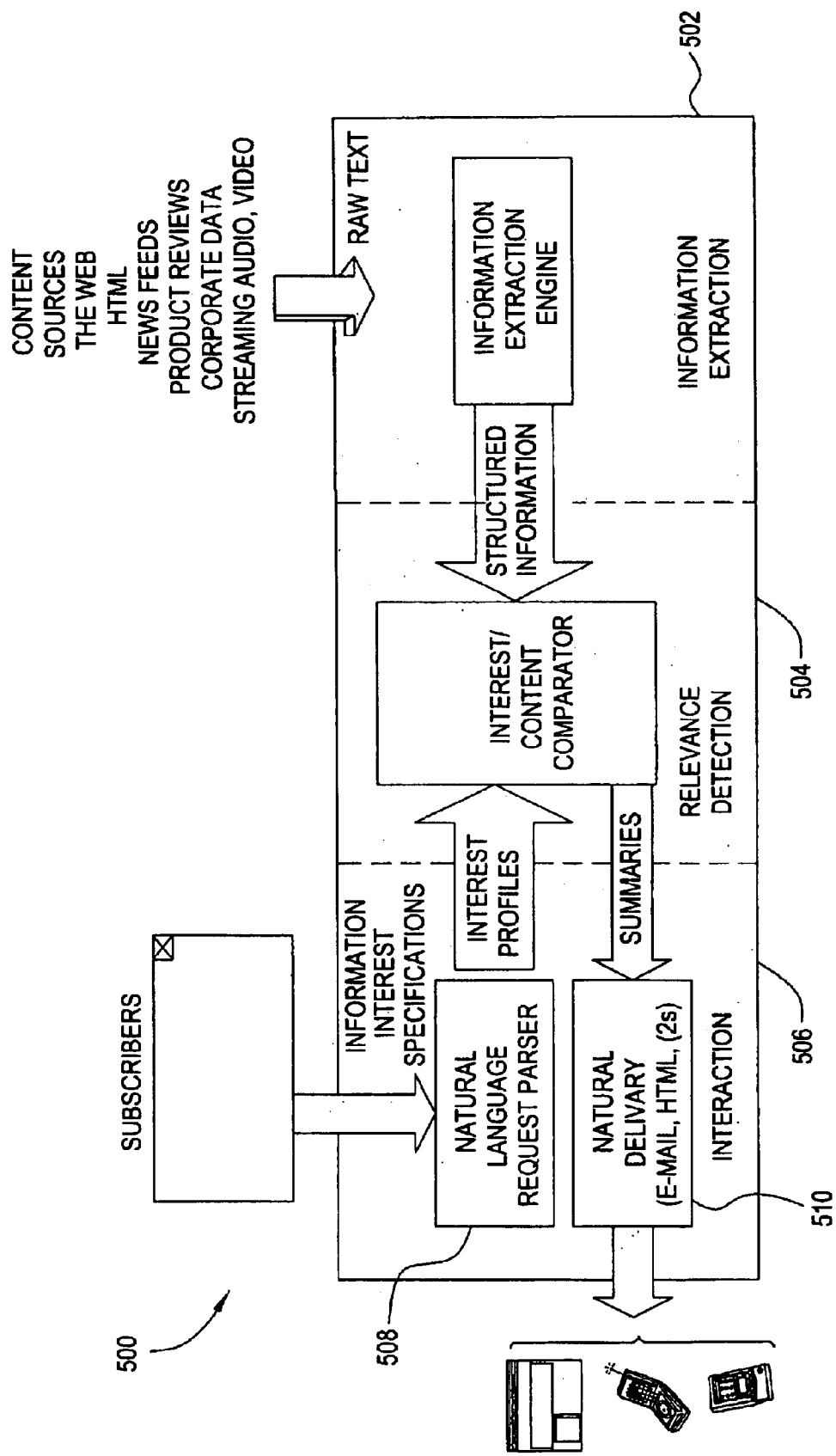
FIG. 5 is an illustration showing an automated information discovery system, in accordance with an embodiment of the present invention.

FIG. 5 is an illustration showing an automated information discovery system 500, in accordance with an embodiment of the present invention. The automated information discovery system 500 includes an information extraction module 502, a relevance detection module 504, and a user interaction module 506.

The Information Extraction (IE) Module 502 operates in the same way as in question-answering mode.

The Relevance Detection Module 505 compares the information content of newly discovered documents or news articles to user interest profiles.

The User Interaction Module 506 includes two major components: a natural language parser 508 that accepts user information requests, and converts those requests into Interest Profiles (persistent queries); and an information delivery unit 510 that delivers the relevant documents. The information delivery unit 510 may be custom web news page, or if paired with OAA™, can incorporate more sophisticated messaging that optionally includes e-mail, text-to-speech (telephony), and wireless digital messaging for hand-held devices 512. OAA is described in greater detail in co-pending U.S. patent application Ser. No. 09/225,198, which is incorporated herein by reference.

The present invention separates linguistic pattern recognition into steps: first recognizing phrases, which can be done reliably by making use of purely syntactic information, and second recognizing meaningful patterns within the parsed phrases, which requires use of topic-specific context.

Figure 6:
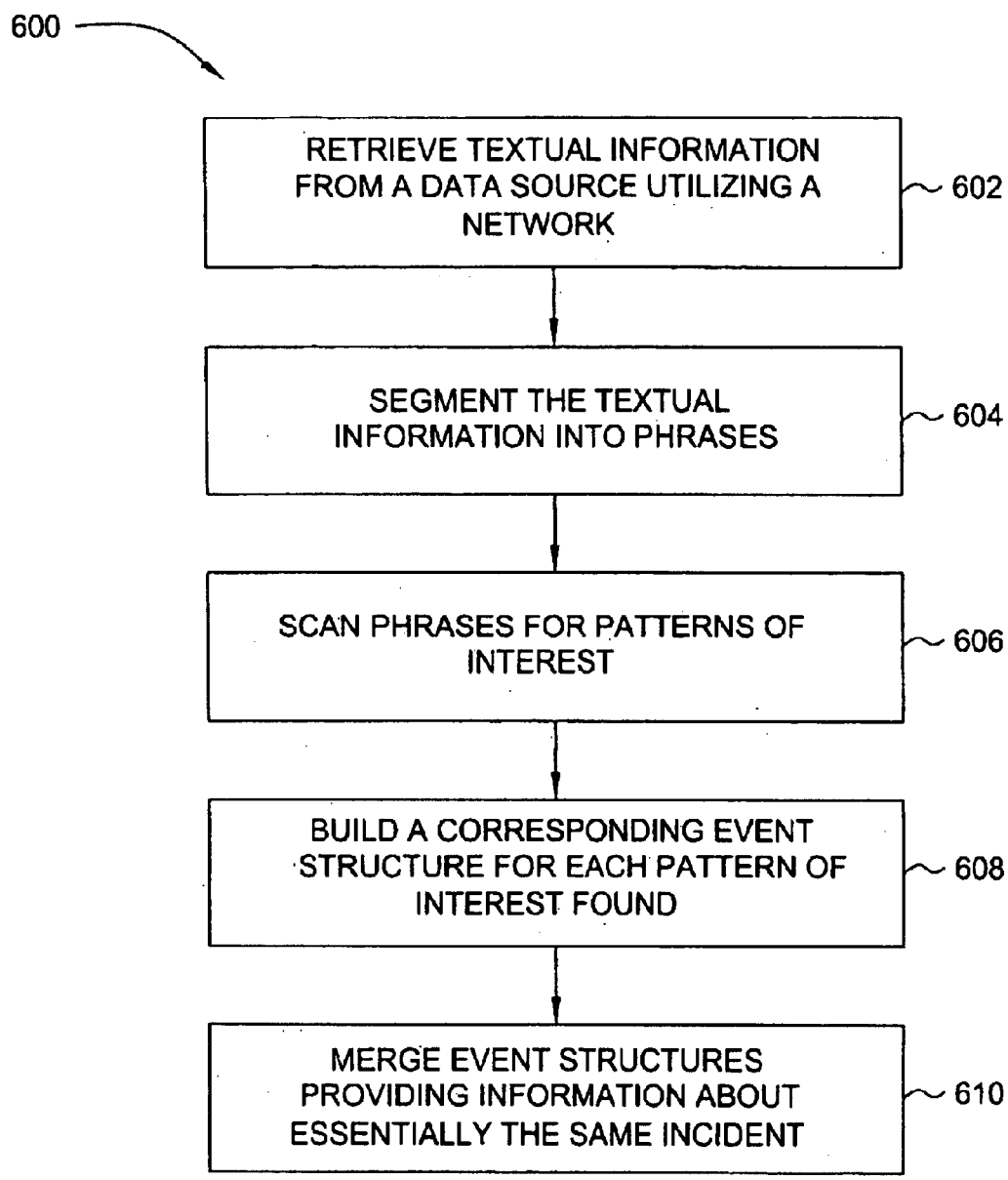
FIG. 6 is a flowchart showing a method for linguistic pattern recognition in accordance with an embodiment of the present invention.

FIG. 6 is a flowchart showing a process 600 for linguistic pattern recognition of information, in accordance with an embodiment of the present invention. Initially, textual information is retrieved from a data source utilizing a network in operation 602. Next, in operation 604 the textual information is segmented into a plurality of phrases, which may be noun groups, verb groups, and other phrases. The phrases are then scanned for patterns of interest, in operation 606. For each pattern of interest found, a corresponding event structure is built. See operation 608. Event structures that provide information about essentially the same incident are then merged in operation 610.

The IE engine of the present invention may be implemented in Common Lisp and run on a Solaris, Linux/FreeBSD, NT, and MacOS. Benchmark tests indicate that the IE engine processes text at a rate of about 1 KB/sec, or about 85 MB/day on a commercial dual-processor 750-MHz P-III Intel processor. This performance is well beyond what is required to manage most news feeds.

The Web-based user interface may be constructed as a server-side Java program, or Servlet, operating in conjunction with a standard httpd Web server. Through this architecture, the user interface module can be scaled in much the same way as major high-volume Web sites. The second user interface component processes the user's information requests. This task is carried out by a second, specialized IE engine.

In one embodiment the information recall and routing module is implemented as a standard SQL database, which is intended for lighter weight application. In another embodiment, a highly scalable implementation hosted on top of the AltaVista search toolkit may be used. Other implementations, both custom-coded or created on top of other Internet search engines, are also possible, as will be apparent to those skilled in the art.

The following describes, by way of example, the internal data storage and retrieval aspects of the present invention. In the given example, a typical business news article is processed through a series of topic grammars. The system recognizes that a corporate acquisition has taken place, and extracts the essential elements of information, including the involved companies and their roles, the time of the event, and location. This information can then be used in several ways, including to generate brief article summaries (e.g., "Feb. 11, 2000: IBM buys Accessible Software Corporation"), route information to subscribers, or answer a user's detailed questions about the event.

Input File

The following is a snippet from a news data stream provided by ClariNet's business news service:

Organization: Copyright 2000 by Business Wire (via ClariNet)

Message-ID: <BibmURNmj_AFB@clari.net>

Lines: 15

Date: Fri, 11 Feb. 2000 14:20:08 PST

AUSTIN, Tex. and FLORHAM PARK, N.J.—(BUSINESS WIRE)—Feb. 11, 2000—IBM (NYSE:IBM) today announced it had successfully completed the acquisition of Accessible Software. An agreement for the transaction had been previously announced on Jan. 14, 2000. IBM's Tivoli(R) Systems will control and manage the unit, which will become part of its Tivoli Enterprise Business Unit, . . .

Information Extraction (IE) Engine Output

The IE engine produces a structured data record which encodes the key facts of the article, including references to the source document, time, date, locations, and topic-specific entries. In this example, the system recognizes the acquisition of software maker Accessible Software by IBM. The two companies' relative roles are preserved: Accessible Software is identified as the Object of the acquisition (the acquired), and IBM as the Agent (the buyer).

<TEMPLATE-200002120113BibmURNmj_AFB-1>

DOC_NR: 200002120113BibmURNmj_AFB {13:28}

DOC_FILENAME: 2000/02/12/clari.biz.mergers.releases/17 { }

DOC_DATE: Fri, 11 Feb. 2000 {473:16}

DOC_TIME: 14:20:08 PST {490:12}

DOC_SOURCE: Business Wire {390:13}

SENTENCE_SPANS: {674:173,848:84,938:122, 1067:122,1190:80,1277:120} { }

PARAGRAPH_SPANS: {674:258,938:122,1067:203, 1277:120} { }

CONTENT: <MNA_EVENT-200002120113BibmURNmj_AFB-1>{674:173, 938:23,1127:13,1277:3}

<MNA_EVENT-200002120113BibmURNmj_AFB-1>

AGENT-COMPANIES: IBM {746:3}

AGENT-COMPANY-PTRS: <ORGANIZATION-200002120113BibmURNmj_AFB-38>{938:23, 1127:13,1277:3}

OBJ-COMPANIES: Accessible Software {827:10,838:8}

OBJ-COMPANY-PTRS: <ORGANIZATION-200002120113BibmURNmj_AFB-3> {746:3,807:16,827:10,838:8}

COMPANIES: <ORGANIZATION-200002120113BibmURNmj_AFB-3>* <ORGANIZATION-200002120113BibmURNmj_AFB-38>

{746:3,807:16,827:10,838:8,938:23,1127:13,1277:3}

EVENT_TYPE: MNA

{729:4,734:3,740:4,746:3,750:10,761:5,767:9,777:2, 780:3,784:12,797:9,807:3,812:11,824:2,827:10,838:8}

EVENT_DESC: Feb. 11, 2000 IBM (NYSE: IBM) today announced it had successfully completed the acquisition of Accessible Software {729:117}

EVENT_SENTENCE: AUSTIN, Tex. and FLORHAM PARK, N.J.—(BUSINESS WIRE)—Feb. 11, 2000—IBM (NYSE:IBM) today announced it had successfully completed the acquisition of Accessible Software. {674:173}

<ORGANIZATION-200002120113BibmURNmj_AFB-3>

NAME: Accessible Software {827:19}

TYPE: COMPANY {827:19}

ALIASES: Accessible Software {827:19}

<ORGANIZATION-200002120113BibmURNmj_AFB-38>

NAME: IBM Company {1127:13}

REFEXPNS: _company-name_ {938:23}

DESCRIPTORS: IBM's Tivoli (R) Systems {938:23}

TYPE: COMPANY {1277:3}

REFTYPE: POSS {938:23}

ALIASES: IBM Company * IBM {1127:13*746:3,938:3, 1277:3}

The system also makes opportunistic use of other referenced relationships. For example, in the final substructure (see immediately above) the system has recognized that Tivoli is a company owned (possessed) by IBM. The recognition of this latter fact, although not the main point of the article, enables the system to answer questions of the form "who owns Tivoli".

Figure 7:
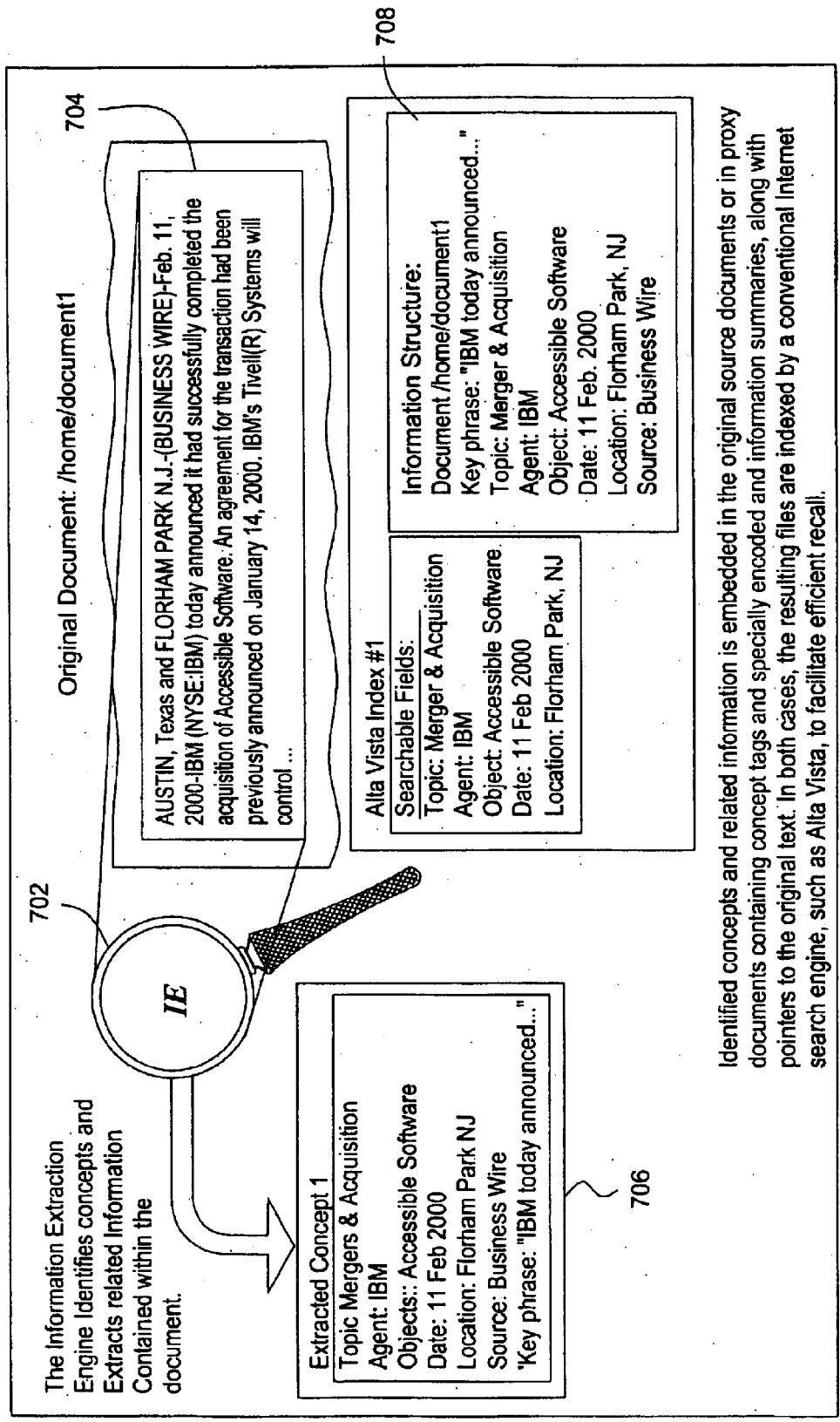
FIG. 7 illustrates pictorially a process of preparing an information cache according to one embodiment of the present invention.

FIG. 7 illustrates pictorially the process of preparing the information cache. The information cache is based on "concept-based storage": that is, the IE engine identifies and indexes information in a topic-specific normalized format. This enables information retrieval based on concept, independently from the way the information may have been expressed in the source documents or in the user's query.

Continuing with the example, the IE engine 702 has processed a business news article 704 and recognized, as shown in box 706, a corporate acquisition event, that the buyer (the Agent) was IBM, the purchased entity (Object) was Accessible Software, along with the date of the referenced event, the location, source of the article, and the key sentence(s) in the original article 704 from which this information was derived. This data is then structured in an information frame 708 and asserted to the information cache.

The information cache both stores the content of the frame, and establishes normalized, searchable fields. A pointer to the original article is also stored for later rapid access (e.g., to provide a user with a hyperlink). Many different specific implementations are possible within this strategy. A preferred embodiment takes advantage of AltaVista's definable fields capability. Fields are attribute-value pairs that provide a method by which external or meta information can be associated with a document. This information can both provide the basis for a search, and extracted from its associated document (e.g., when the document is referenced from some other search). Fields are defined as attribute-value pairs of the form attribute:its_value, where the attribute is a string, and the value can be any integer or string.

Figure 8:
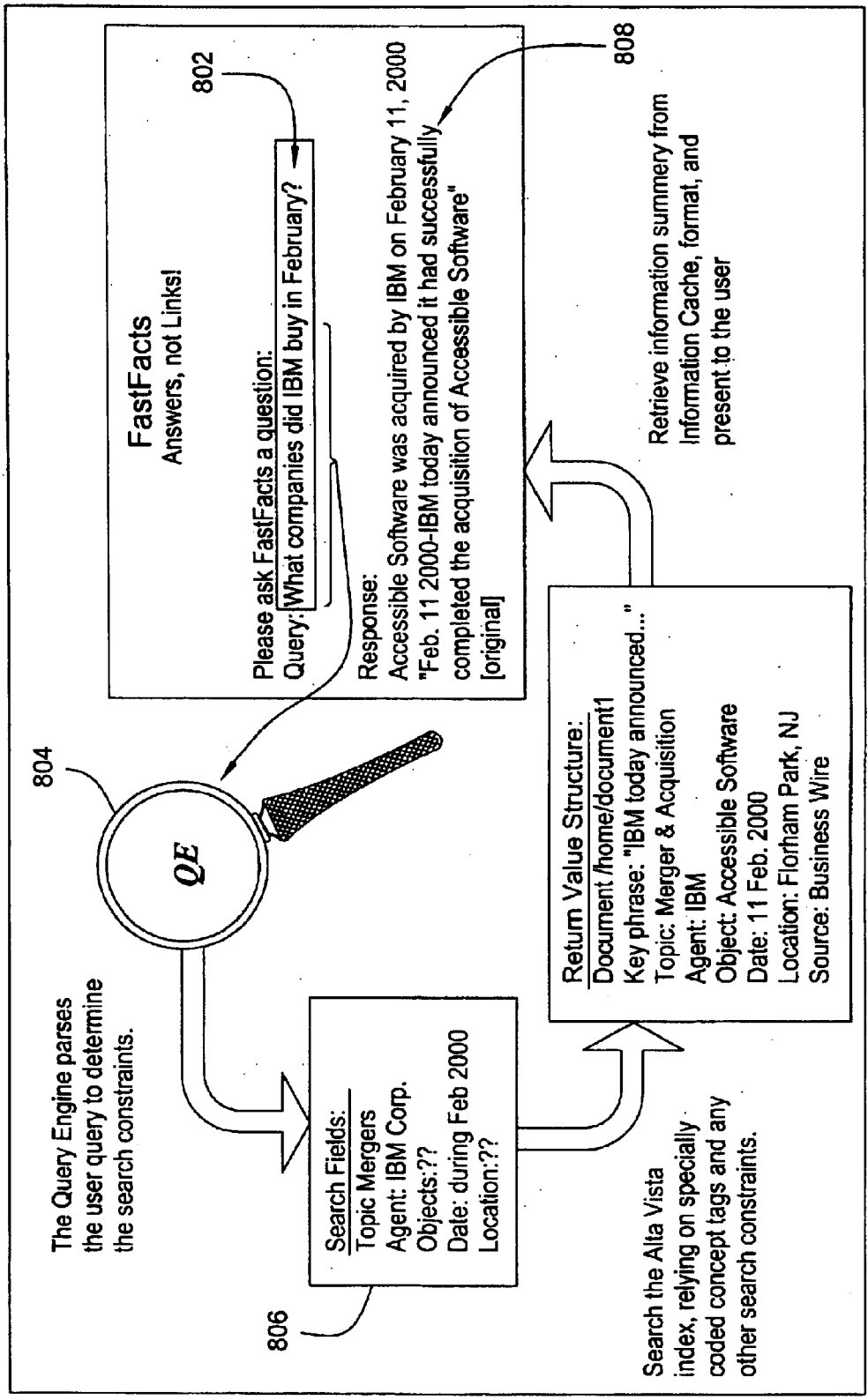
FIG. 8 depicts a process for network-based information retrieval according to an embodiment of the present invention.

The fields have been chosen to be generic, and largely independent of the application domain (business news vs. sports, for example, may use many of the same fields). In our IBM acquisition example, the searchable fields are encoded as:

EventType: Merger&Acquisition
Agent: IBM
SubjectEntityType: Corporation
Object: Accessible Software
ObjectEntityType: Corporation
EventDate: 11 Feb. 2000
EventReportedLocation: AUSTIN, Tex.; FLORHAM PARK, N.J.

with additional, similarly defined fields for the other (non-searchable) elements of information:

Document: /home/document1
Key phrase: "IBM today announced it had successfully completed the acquisition of Accessible Software."
Source: Business Wire As shown in FIG. 8, information retrieval is carried out in three steps:

1. The user's question 802 is parsed by the Query Engine 804, and converted (normalized) to a format consistent with the internal data structures.
2. A search constraint set 806 is derived from the parsing results.
3. The information that satisfies the search constraints is retrieved and used to form a summary response 808.

In addition, the user can follow a hyperlink to the original source document to find the information in context.

Continuing with the IBM example, let us assume that a user asks the question:

"What companies did IBM buy in February"

Following through the process, then,

Step 1: the question is converted to an internal query form:

EventType: Merger&Acquisition
Agent: IBM
AgentEntityType: Corporation
Object: *
ObjectEntityType: Corporation
EventDate: * February 2000
EventReportedLocation: *

Where * represents the wildcard character; that is, any value will satisfy this constraint in these fields.

Step 2: the query, or search constraint, is used to execute a search against the recorded information. This may be carried out as a C function call in the AltaVista search development kit (SDK). This search is analogous to a Boolean search command of:

EventType=Merger&Acquisition AND AgentEntityType=Corporation AND
ObjectEntityType=Corporation AND EventData= *February 2000

Step 3: the entire collection of extracted information, as given in the section above, is retrieved and used to form a summary response to the user:

Accessible Software was acquired by IBM on Feb. 11, 2000

Figure 9:
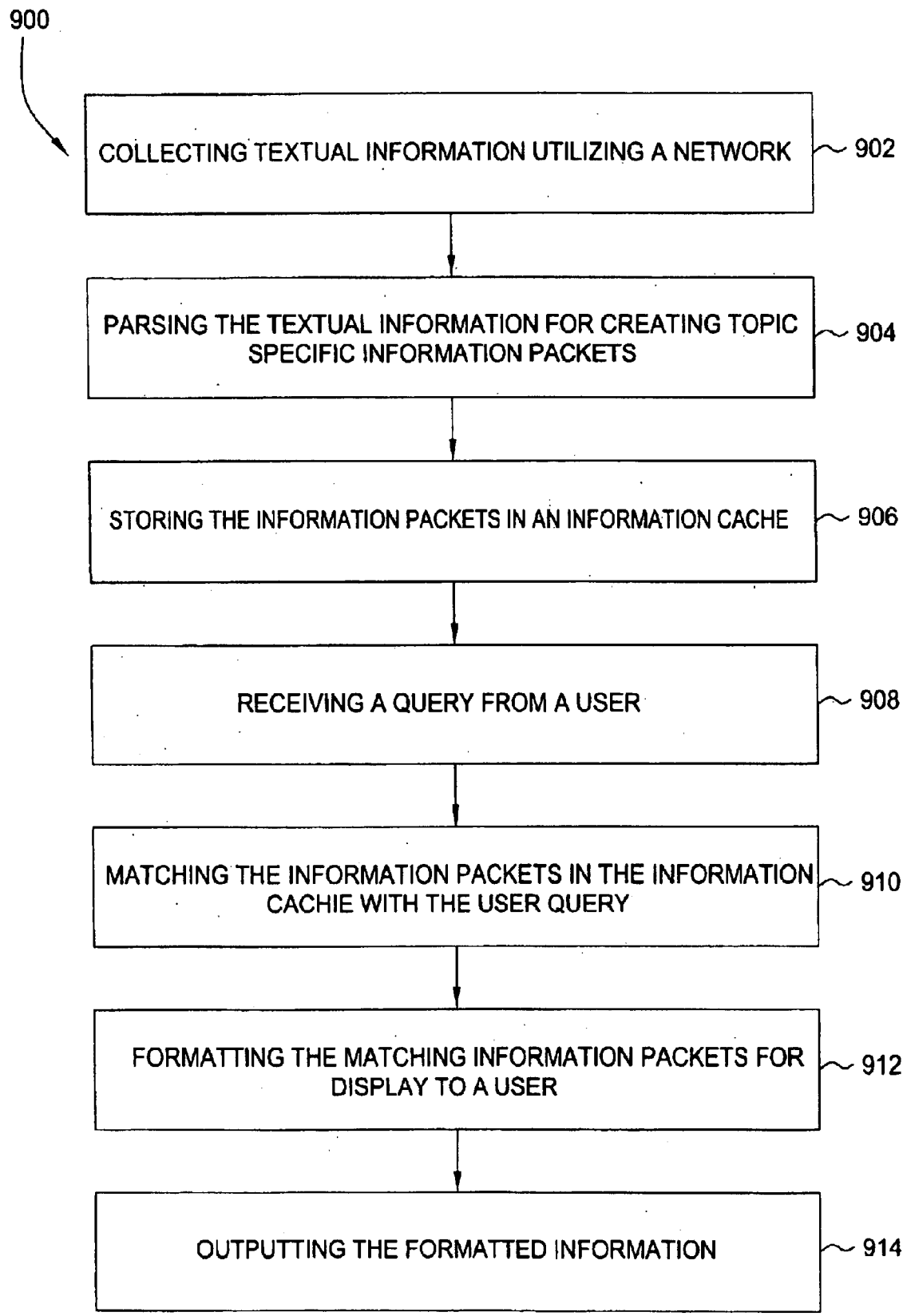
FIG. 9 depicts a flowchart of a process for allowing concept based information searching according to one embodiment of the present invention.

Accordingly, FIG. 9 depicts a process 900 for allowing concept based information searching according to one embodiment of the present invention. In operation 902, textual information from various sources is collected utilizing a network. In operation 904, the textual information is parsed to create topic specific information packets, which are stored in an information cache in operation 906. In operation 908, a query is received from a user, which, as mentioned above, may be input in natural language. The information packets in the information cache are matched with the user query in operation 910. Matching information packets are formatted for display to a user and output in operations 912 and 914, respectively.

In one embodiment of the present invention, the query is converted into an internal query form that is used to find matching information in the information cache. In another embodiment of the present invention, if the user query is not understood, a conventional keyword or Boolean search is executed utilizing the terms of the user query. This search may be executed locally, using the same corpus as in the question-answering mode, or from other, remote search engines available across networks. Information matching the user query is output to the user. In yet another embodiment of the present invention, the formatted information includes a hyperlink to the original source of the textual information.

The various embodiments of the present invention can make use of conventionally indexed terms derived from the original source documents. Conventional indexing provides two benefits:

Providing a reasonable fall-back capability when a user's question is completely outside of the domain of the indexing grammars higher-precision topic coverage of the present invention.

Recognizing and exploiting additional constraints in a user's question.

The fall-back capability is triggered when the user's query is not understood, for example, a sports question on a business news site. In this case, the system executes a standard Internet search engine operation, and relays relevant articles based on key word patterns. Note that user questions cannot be directly answered as in the case for questions within our indexing grammars. In one embodiment, the AltaVista SDK provides the required functionality. A separate AltaVista index file is created from the original source documents to support this feature.

The second and more sophisticated situation occurs when a user's question is partially understood, but a significant noun phrase or other qualifying factor is present by not recognized. For example, a corporate announcements grammar may recognize articles where corporations make a public announcement of any general sort. Suppose then that a user asks:

"what announcements has IBM made on antigravity physics this year?"

The system recognizes:

"what announcements has IBM made on <unrecognized noun phrase> this year?"

The system responds by constraining the information search utilizing the part of the question it can understand, in this case finding all of this year's announcements from IBM, and then locating within those articles containing the noun phrase "antigravity physics." The natural language capabilities of the present invention have contributed on several accounts: first to recognize and execute against the part of the question that it did understand, and second to recognize the specifying noun phrase that would enhance the additional qualifying search.

The present invention can also incorporate information encoding standards such as XML. Conforming to an industry standard such as XML has obvious benefit to systems integration, specifically:

1. The present invention can directly import XML-encoded data sources, thus enabling question-answering and information routing from 3rd-party XML-encoded corporate documents and e-commerce databases.
2. The present invention can export its extracted information to other XML consumers, such as databases or 3rd-party knowledge management tools.

Figure 10:
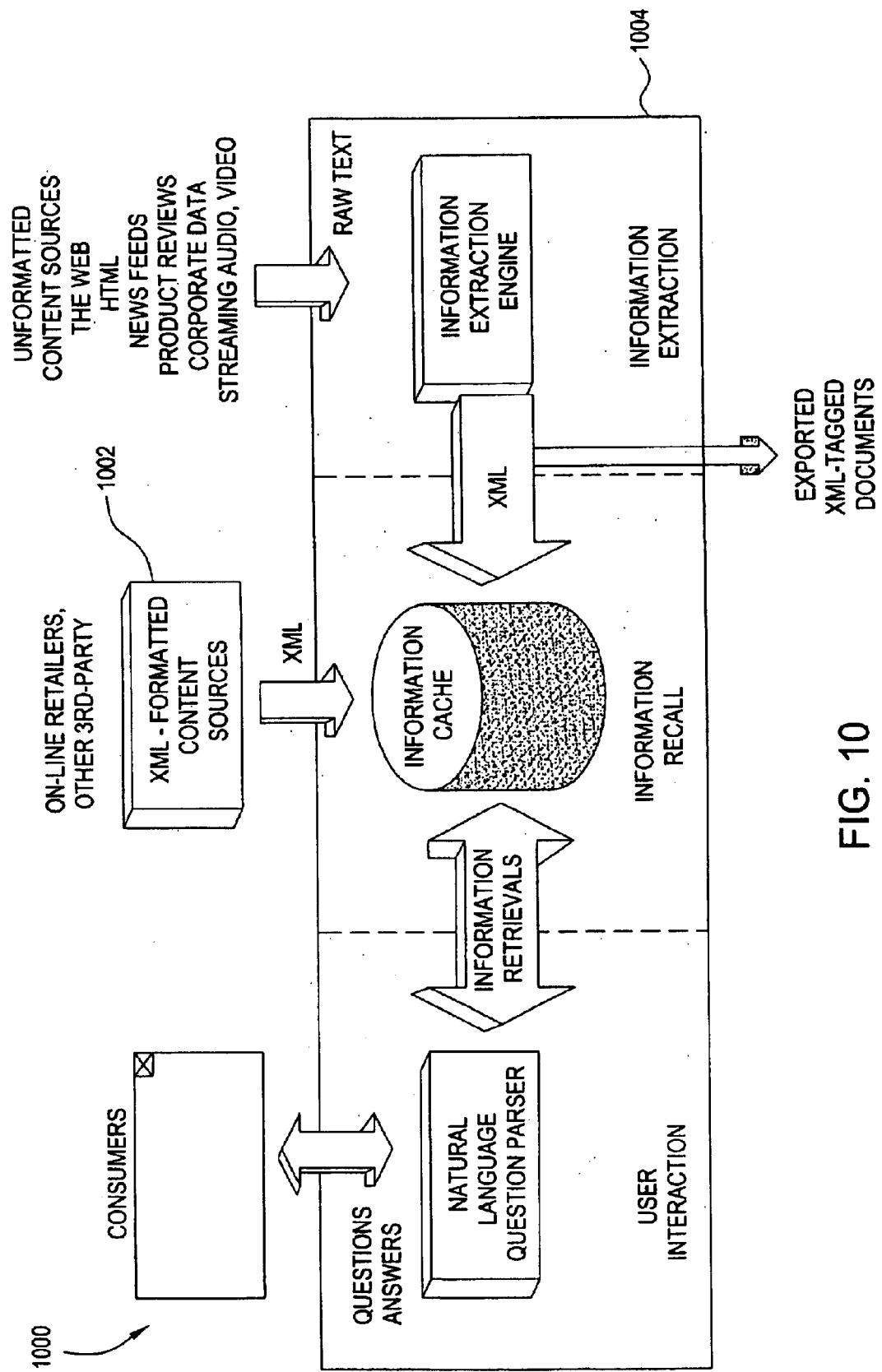
FIG. 10 is an illustration that summarizes the role of XML within a system architecture of the present invention.

FIG. 10 summarizes the role of XML within a system architecture 1000 of the present invention. See FIGS. 4 and 5 for examples of system architectures of the present invention. As shown, XML-formatted content sources 1002 directly into the information cache. XML also provides an encoding scheme by which information is transmitted and cataloged in the information extraction module 1004. New data types can be rapidly introduced to the system by defining Document Type Definitions (DTDs); question answering on new data types may require additions to the query parser grammars.

The XML model for information encoding is ideal for Information Extraction tasks. Continuing with our example, the extracted information regarding the IBM acquisition of Accessible Software Corporation is represented as an XML document.

<event>
<eventType>"Merger&Acquisition"</eventType>
<agent>
<agentName>"IBM"</agentName>
<agentEntityType>"Corporation"</agentEntityType>
</agent>
<object>
<objectName>"Assessible Software"</objectName>
<objectEntityType>"Corporation"</objectEntityType>
</object>
<eventDate>"11 Feb. 2000"</eventDate>
<eventLocation>"Floram Park, N.J."
<eventLocation>"Austin, Tex."</eventLocation>
. . .
</event>

The present invention then indexes this information for recall on any of the defined fields, in much the same way as shown before. Note that, unlike HTML, XML separates the specification of information storage from that of presentation. As a result, presentation style (cascading style sheets, CSS, etc.) can be customized for each application, without modification to the underlying database of information.

Information Retrieval by Natural Language Querying

Figure 11:
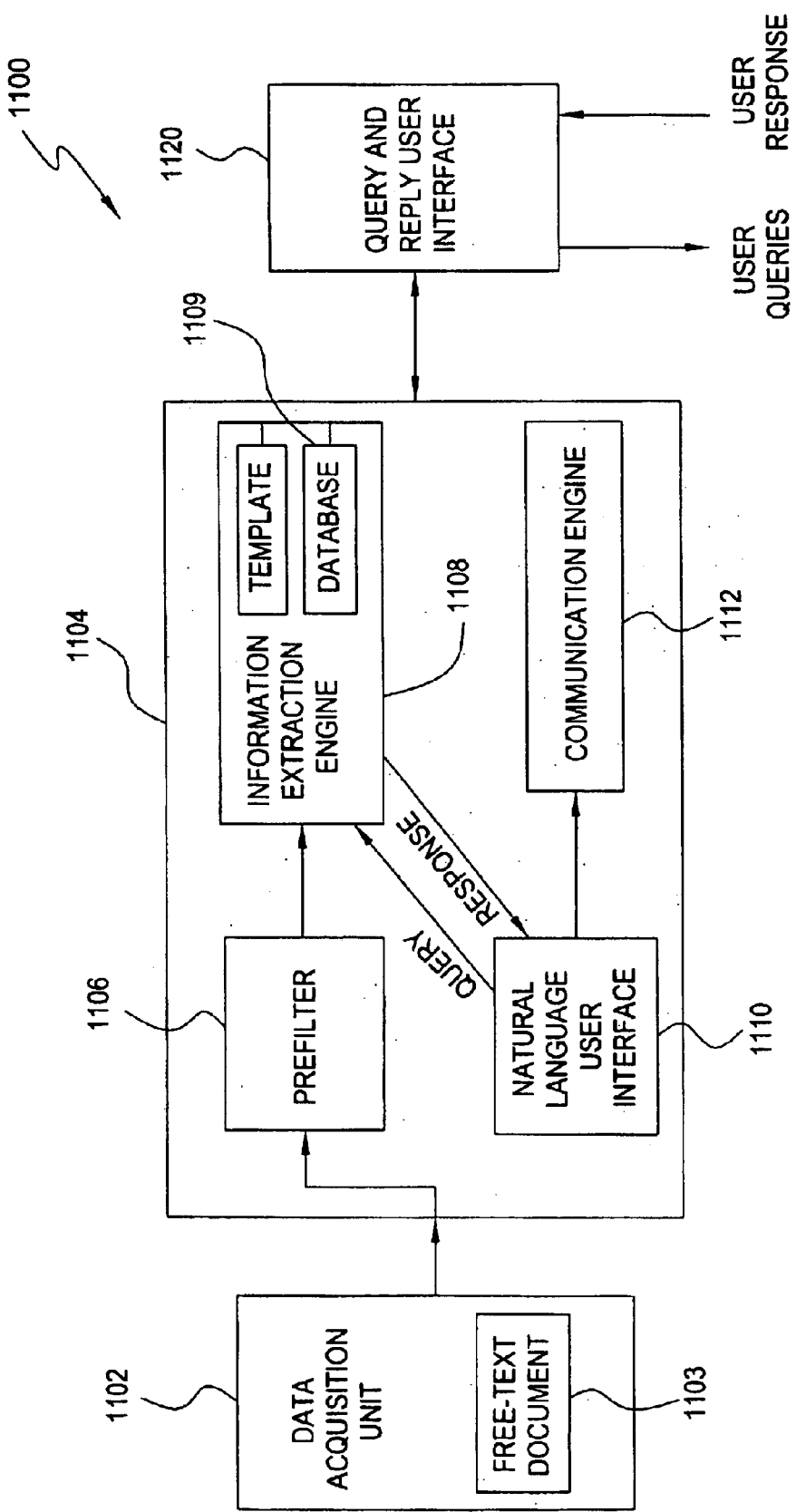
FIG. 11 is a diagram of a natural language information retrieval system.

FIG. 11 shows a system 1100 for providing information in response to a natural language query from one or more users. The system of FIG. 11 has a data acquisition system 1102 for storing a corpus 1103 of documents expressed as natural language texts (free-texts). The corpus 1103 of free-text documents stored in the data acquisition system 1102 can be continuously updated through a combination of web crawlers, news services, specialized databases, and manual or the results of one or more automated Internet search engine queries. The corpus 1103 can capture documents that are already in text format, or can capture text from a multimedia source (such as video or television/radio transmissions) using a suitable converter such as a speech recognizer or a closed-caption decoder, as discussed in more detail below. For a multimedia source, the text is stored with markers pointing to segments of the multimedia source to facilitate retrieval of the segments associated with the text.

These documents can also be physically copied to a local file system, or can be remotely accessed from their original site. The output of the data acquisition system 1102 is provided to an information extraction and query engine 1104. The information extraction and query engine 1104 can have a pre-filter unit 1106 to perform preprocessing selection of potentially relevant texts (pre-search filtering). The pre-search filtering operation includes format conversion and categorization of information from the data acquisition system 1102. The information extraction and query engine 1104 also includes an information extraction engine 1108. As explained in more detail below, the information extraction engine 1108 identifies events, entities, and relationships using natural language parsing. The information extraction engine 1108 also includes a database 1109 for storing indices for the text associated with the extracted information from the data acquisition system 1102 and the pre-filter unit 1106.

During a set-up phase, the information extraction engine 1108 parses free-text documents to identify topics (events and relationships of interest) and objects (people, organizations and locations, among others) involved in those events and relationships. The topic and associated objects are defined and constructed by an analyst when the system 1100 is set up, as discussed in more detail in FIG. 12.

An example of a topic (joint ventures) and associated objects is shown below.

{Company/ies} {Set-up} {Joint Venture} with {Company/ies}

From the rules, one or more templates can be generated. An exemplary simplified template schema for a topic on mergers may look as follows:

| Acquisition-Event: | |
|---|---|
| Buyer: | _____ |
| Acquired: | _____ | where each "___" is a slot. Each slot may contain specific requirements to insure proper data entry. For example, in the above example, each slot can be defined to accept only company noun groups.

The execution of the topic rules fills information into slots in the schema, which are then stored in template files. An exemplary template for the sentence "IBM acquired Microsoft", or equivalently "Microsoft was acquired by IBM" may be:

| Acquisition-Event: | |
|---|---|
| Buyer: | IBM |
| Acquired: | Microsoft |

TABLE 1

Once processed, the extracted information is stored and organized in the information cache 1109, which in various instantiations could be a relational

| event type | A | | Text Source | |
|---|---|---|---|---|
| Acquiror | IBM | | 90:3 | ... |
| Acquired | MICROSOFT | | 104:8 | ... | database or modified search engine, to facilitate searches on combinations of topics and objects.

An exemplary table in a relational database implementation can be an M&A Table as shown above in Table 1.

During operation, in response to a query such as "Has Microsoft been acquired?", the information cache 1109 executes a query where Event Type=A (to indicate acquisition as opposed to merger) and Acquired=Microsoft. The query can be stated in a natural language such as English or can be, for instance, menu-driven. Moreover, as described in more detail below, an operation similar to the above operation can be used to extract concepts from a natural language such as an English question and convert that question into a query. The texts satisfying the query are retrieved by looking-up the Text Source and the remaining columns. The results are then summarized, highlighted and provided to the user in a distilled manner, as shown in FIGS. 17 and 18.

Optionally, the text files can also be tagged with Extensible Markup Language (XML) directives to support features such as content-sensitive text highlighting within browsers, as well as integration with other XML-compliant document management and search systems. In one embodiment, the information extraction engine may be the Finite State Automaton Text Understanding System (FASTUS) system available from SRI of Menlo Park, Calif., which extracts information from natural language text for entry into a database.

The output of the information extraction engine 1108 is provided to a communications engine 1112 to handle various communications protocols such as Hypertext Transfer Protocol (HTTP). The communication engine 1112 also receives input from a natural language query user interface 1110. The natural language user interface 1110 processes data from a query and reply user front end 1120. The query and reply front end 1120 converts user queries, which can be natural language queries, or search terms, into an internal query format and submits the query to the information extraction and query engine 1104. Exemplary natural language queries can be "Tell me about joint ventures involving SBC in the Communications Services Sector" or "Did Barnes & Noble acquire anyone this year?" Exemplary search term queries can be "'joint ventures' AND SBC" or "'Barnes & Noble' AND buy OR purchase."

In response, the information extraction and query engine 1104 performs a database search and returns the result to the natural language user interface 1110. The natural language user interface 1110 in turn sends this information to the communication engine 1112. The output of the communication engine 1112 is provided to the query and reply front end 1120. Embodiments of the query and reply front end 1120 can provide natural language responses and can summarize the response.

Prior to operation, the system of FIG. 11 needs to be set-up. During this phase, an analyst reviews a small sample of typical documents of the kind associated with a topic to be supported by the system 1100. The topic may be specific, such as mergers and acquisitions, or may be more general, such as issues in education, medicine or law. Based on the document review, the analyst formulates a set of rules. In one embodiment the rules are specified using a declarative specification language with an execution semantics called FastSpec, whose specification is described below in the section entitled "FASTSPEC GRAMMAR SPECIFICATION LANGUAGE". In one embodiment, the patterns are specified by regular grammars. The applicability of the rules is conditioned on attributes associated with the terminal symbols, and attributes can be set on the objects constructed. In another embodiment, the rules take the form of regular productions that are translated automatically into finite-state machines by an optimizing compiler.

Using the declarative pattern language, application-independent, clause-level patterns can be instantiated by application-specific instances. Typically, these instances are tied to the argument structure of the topic-relevant verbs, that is, what kinds of things they take as agents and what kind, as objects and how these relations are expressed. The rules to instruct the system on how free text is to be processed can be PATTERN==>ACTION rules. For example, in the context of joint-ventures, one text pattern to recognize may be:

{Company/ies} { Set-up} {Joint Venture} with {Company/ies}.

Additional rules are specified so that {Company/ies} covers all expected variations of company names that may appear. Similarly, all known variations of {Set-up} and {Joint-Venture} are specified so that the idea or concept underlying the query can be searched. The II ACTION" rules eventually produce templates that contain or represent the information in the texts, as well as containing information about the text (e.g., the location of the text in the source material).

Figure 12:
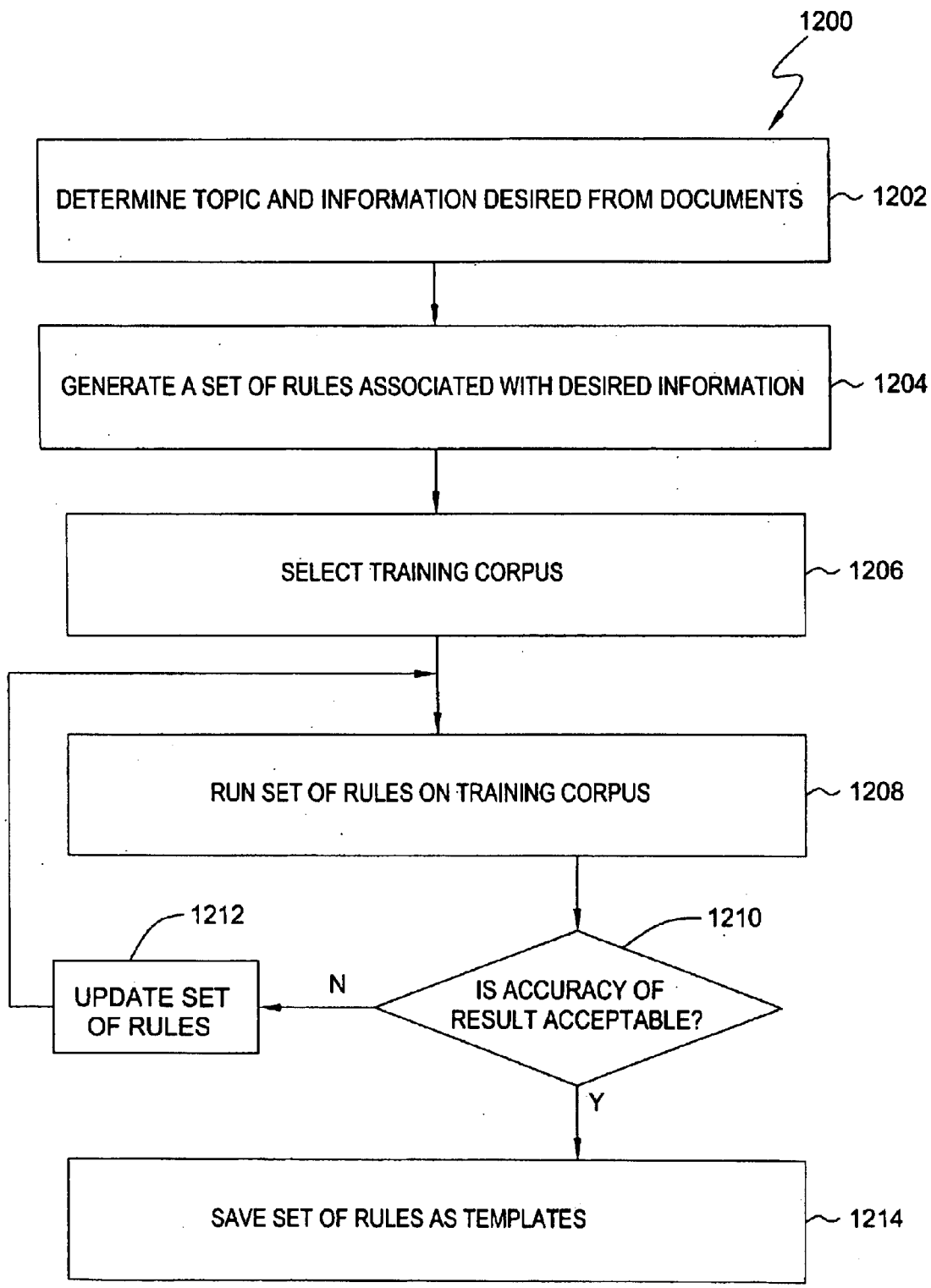
FIG. 12 is a flowchart of a process for setting up the system of FIG. 11.

FIG. 12 shows a process 1200 for setting up the system of FIG. 11. First, based on the selected topic that the system 1100 is expected to process, an analyst determines the type of information desired (step 1202). Next, the analyst generates a set of rules in accordance with the desired information (step 1204). A training corpus of typical documents is then selected (step 1206), and the set of rules generated in step 1204 is executed on the training corpus (step 1208). The analyst then checks whether the accuracy of the result generated by the set of rules is acceptable (step 1210). If not, the rules are revised (step 1212) and the process 1200 loops back to step 1208 to continue training the system. From step 1210, if the accuracy is acceptable, the rules are then saved (step 1214). These grammar files are then run against texts and the results are translated into entries in the database 1109, which are subsequently used to provide information in response to a query. In this manner, a corpus is processed to yield a set of templates representing various topic-specific information contained in the texts and relating that information back to the texts.

Figure 13:
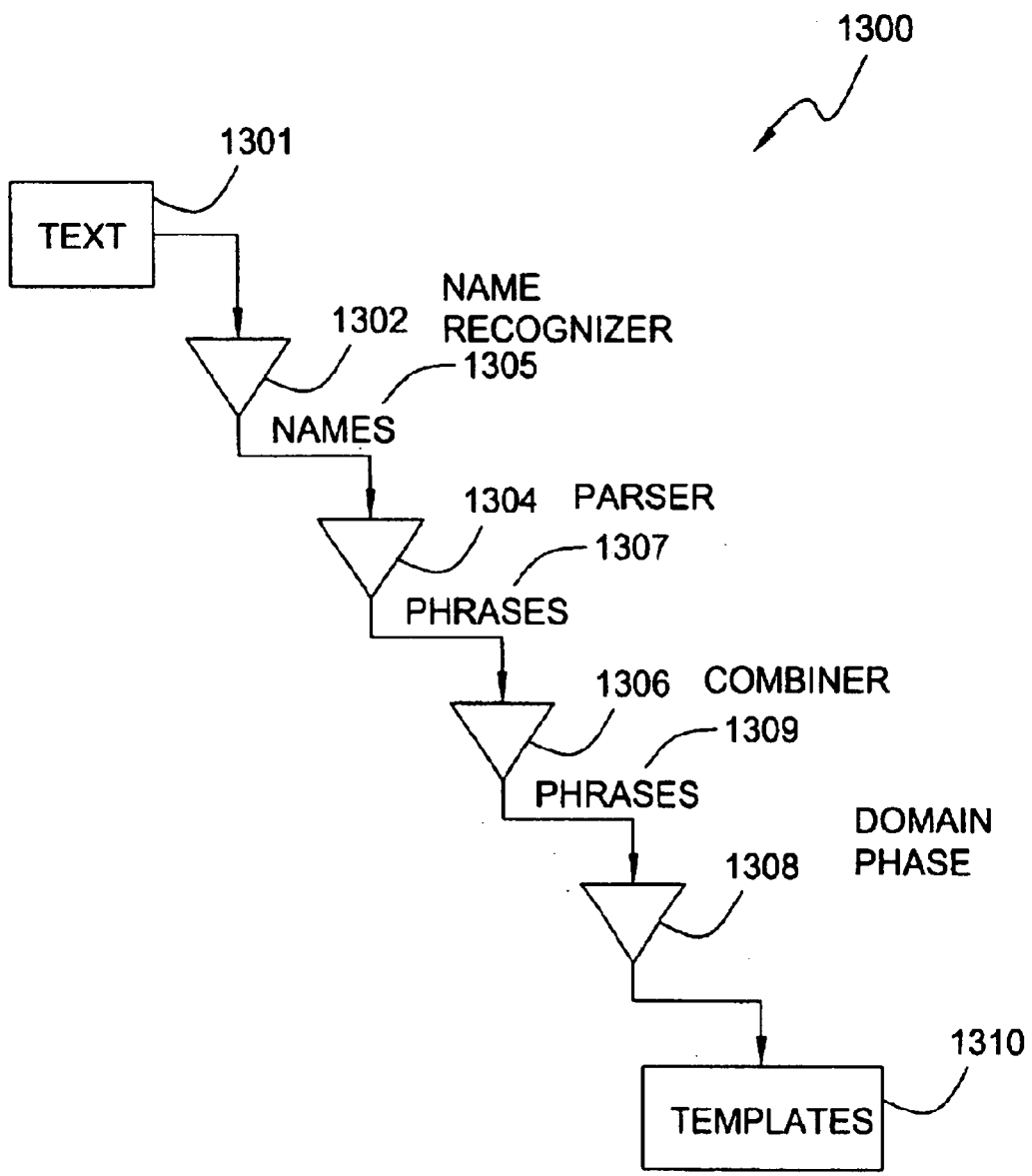
FIG. 13 is a block diagram illustrating a finite state automaton associated with the system of FIG. 11.
Figure 14:
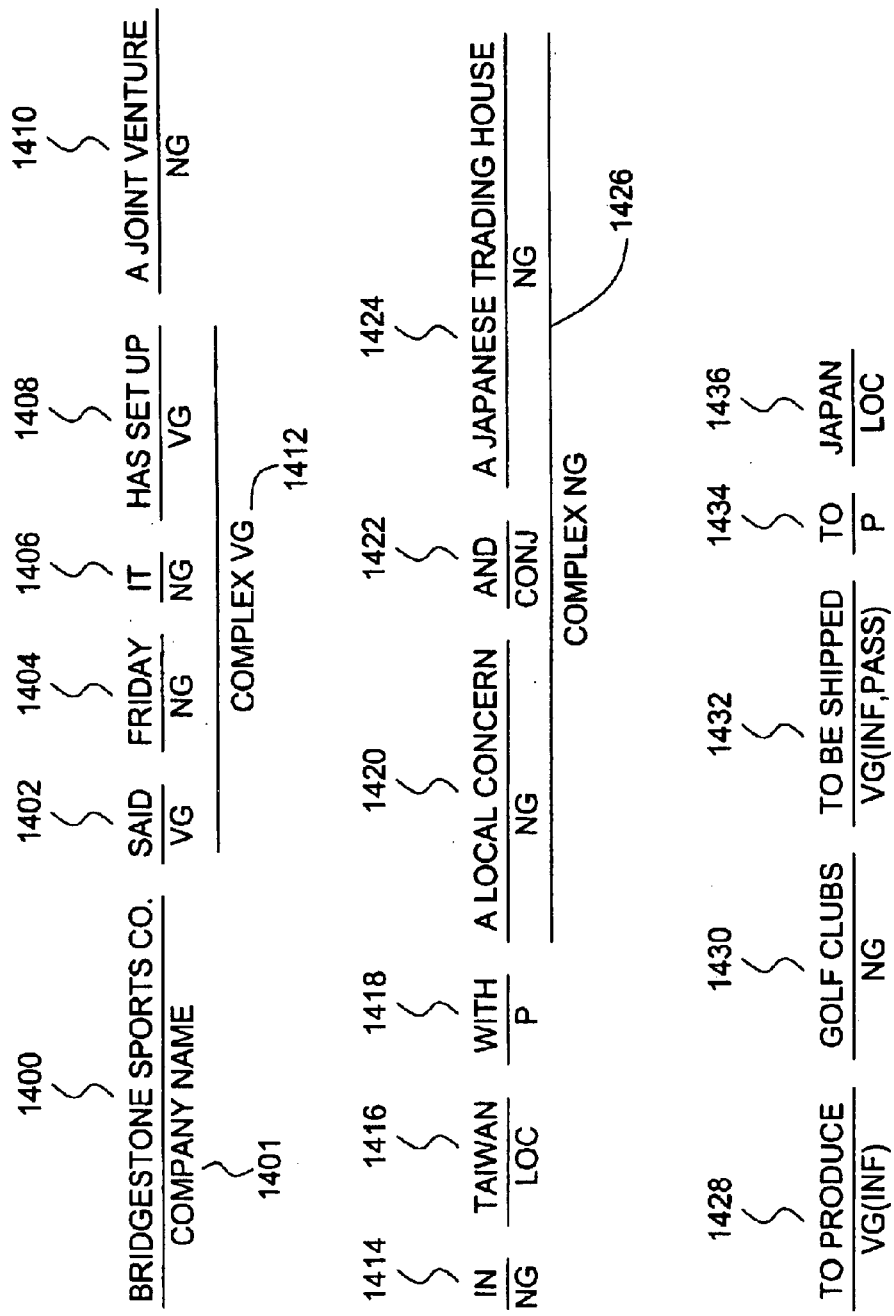
FIG. 14 illustrates the classification of an example sentence using the automaton of FIG. 13.

FIG. 13 shows a cascaded, nondeterministic finite state automaton 1300 for processing natural language text in the information extraction engine 1108, while FIG. 14 shows an exemplary sentence which is operated upon by the automaton 1300 to illustrate its operation. In the automaton 1300, successive stages of processing are applied to the input, patterns are matched, and corresponding composite structures are built. The composite structures output by each stage are provided as input to the next stage. First, names and other fixed form expressions are recognized. Next, basic noun groups, verb groups, and prepositions and some other particles are recognized. Certain complex noun groups and verb groups are then constructed, patterns for events of interest are identified and corresponding "event structures" are built. Finally, distinct event structures that describe the same event are identified and merged, and these structures are used in generating entries in the database 1109. This decomposition of language processing enables the system to perform an appropriate amount of domain-independent syntax, so that domain-dependent semantic and pragmatic processing can be applied to appropriate larger-scale structures.

Referring to FIG. 13, the automaton 1300 receives free text from the free-text document 1103 of the data acquisition unit 1102 (FIG. 11). The free text is transformed into a sequence of text tokens 1301, which is provided to a name recognizer 1302. The name recognizer 1302 identifies and extracts names 1305 and acronyms as well as multi-words such as "because of" that are combined to form single lexical items from the text 1301. The output 1305 of the name recognizer 1302 is provided to a parser 1304 for handling basic phrases 1307. The parser 1304 constructs basic syntactic constituents of the language, consisting only of those that can be nearly unambiguously constructed from the input using finite-state rules (i.e., noun groups, verb groups, and particles).

The output 1307 of the parser 1304 in turn is provided to a combiner 1306. The combiner 1306 handles complex phrases 1309 such as complex noun groups and complex verb groups. The combiner 1306 produces larger constituents from the output of the parser when it can be done fairly reliably on the basis of local information. Examples are possessives, appositives, "of prepositional phrases ("John Smith, 56, president of IBM's subsidiary"), coordination of same-type entities, and locative and temporal prepositional phrases.

The name recognizer 1302, the parser 1304, and the combiner 1306 are mostly domain independent. The output 1309 of the combiner is eventually provided to a domain phase transducer 1308, which is domain dependent. The domain phase transducer 1308 scans the sequence of phrases for patterns for events of interest to the topic being searched, and when they are found. builds structures that encode the information about entities and events contained in the pattern. A merge phase 1306 merges structures arising from different parts of the text if they provide information about the same entity or event. The output of the domain phase transducer is stored as one or more templates 1310.

The automaton 1300 thus divides the natural-language handling process into separate levels for recognizing phrases and recognizing event patterns. Phrases can be recognized reliably with syntactic information, and they provide precisely the elements that are required for stating the event patterns of interest. The earlier stages of the automaton 1300 recognize smaller linguistic objects and work in a largely domain-independent fashion. They use linguistic knowledge to recognize that portion of the syntactic structure of the sentence that linguistic methods can determine reliably, requiring little or no modification or augmentation as the system is moved from domain to domain. The later stages take these linguistic objects as input and find domain-dependent patterns among them.

FIG. 14 shows an exemplary sentence used to illustrate the operation of the cascaded nondeterministic finite state automaton 1300. In FIG. 14, "Bridgestone Sports Co. said Friday it has set up a joint venture in Taiwan with a local concern and a Japanese trading house to produce golf clubs to be shipped to Japan." In this sentence, the phrase "Bridgestone Sports Co." 1400 is classified by the automaton 1300 as a company name 1401. A company name 1401 can also include acronyms as well as corporate status. For instance, if the text for the company name 1401 is IBM, the company name could also be interpreted as International Business Machines, IBM Corp. or IBM Corporation. The complex phrase of FIG. 14 also includes a complex verb group 1412. This complex verb group 1412 includes a verb group 1402 (said), a noun group 1404 (Friday), a noun group 1406 (it), and a verb group 1408 (has set up) and a following noun group 1410 (a joint venture) is detected. The complex phrase of FIG. 14 also includes a preposition/particle 1414 (in), a location phrase 1416 (Taiwan), a preposition/participle 1418 (with). The complex phrase FIG. 14 also includes a complex noun group 1426. which includes a noun group 1420 (a local concern). a conjunction 1422 (and) and a noun group 1424 (a Japanese trading house). The complex phrase of FIG. 14 also includes a verb group 1428 (to produce) a noun group 1430 (golf clubs) and a verb group 1432 (to be shipped). The complex phrase of FIG. 14 also includes a participle 1434 (to) and a location 1436 (Japan).

The operation of the automaton of FIG. 13 on the sample text of FIG. 14 is discussed next. These are recognized by a multiword tokenizer. First, the name recognizer 1302 identifies company names like "Bridgestone Sports Co." and "Bridgestone Sports Taiwan CO." The names of people, locations, dates, times, and other basic entities are also recognized at this level. Languages in general are very productive in the construction of short, multiword fixed phrases and proper names employing specialized micro-grammars. However, not all names can be recognized by their internal structure. Thus there are rules in subsequent transducers for recognizing unknown possible names as names of specific types.

The next level of processing, performed by the parser 1304, handles basic phrases such as noun groups, verb groups, and several critical word classes, including certain prepositions. This level identifies certain syntactic constructs. One of these is the noun group, that is, the head noun of a noun phrase together with its determiners and other left modifiers. Another is a "verb group," that is, the verb together with its auxiliaries and any intervening adverbs. Verb groups are recognized by a finite-state grammar that tags them as Active, Passive, Gerund, or Infinitive.

In the third stage of processing, by the combiner 1306, complex noun groups and verb groups that can be recognized reliably on the basis of domain-independent, syntactic information are recognized. This includes the attachment of appositives to their head noun group, for example "The joint venture, Bridgestone Sports Taiwan Co." In the course of recognizing basic and complex phrases, entities and events of domain interest are often recognized, and the structures for these are constructed. In the sample joint-venture text of FIG. 14, entity structures are constructed for the companies referred to by the phrases "Bridgestone Sports Co.," "a local concern," "a Japanese trading house,"and "Bridgestone Sports Taiwan Co." Information about a nationality derived from the words "local" and "Japanese" is also recorded.

The input to the fourth stage of processing by the domain phase transducer 1308 is a list of complex phrases in the order in which they occur. Patterns for events of interest are encoded as finite-state machines, where state transitions are effected by phrases. The state transitions are driven off the head words in the phrases. That is, each pair of relevant head word and phrase type—such as "company-NounGroup," "formed-Passive VerbGroup," "bargaining-NounGroup," and "bargaining-PresentParticiple VerbGroup"—has an associated set of state transitions.

The first three stages of processing 1302, 1304, and 1306 all operate within the bounds of single sentences. The final level of processing 1308 operates over the whole text. Its task is to see that all the information collected about a single entity or relationship is combined into a unified whole. This is one of the primary ways the problem of coreference is dealt with in this embodiment. The three criteria that are taken into account in determining whether two structures can be merged are the internal structure of the noun groups, nearness along some metric, and the consistency, or more generally, the compatibility of the two structures.

The output of the automaton 1300 is a set of template files 1310 that contain information about the texts, including sources and the day and time of the article, as well as topic-specific information extracted, including the participants in the topic event/relationship (e.g., company names, person names). These items are related to specific segments of text to support the answers. These templates are loaded into a data store, so that a user can query the system for articles of interested based on the topic area, period of interest, and the participants involved in the events/relationships of interest.

An exemplary template 1310 will be described next. In this example, the system 1100 extracts information from articles about mergers and acquisitions. The following came from a single sentence: "IBM acquires Microsoft."

The desired information, in this case corporate buyers and sellers, is represented as transitions with a start state and an end state. The remaining information in the template is meta-data, e.g., data about the location in the text (by character position) of the various linguistic elements that supply the source of the extracted information. (For example, 261: 18 means that the relevant linguistic element starts at the position of the 261st character in the article and goes on for 18 characters.)

Turning now to the sentence "IBM acquired Microsoft," the template 1310 might look as follows:

| <MNA EVENT-NIL-1> | | |
|---|---|---|
| COMPANIES: | <ORGANIZATION-NIL-1> * <ORGANIZATION-NIL-2> | {0:3,13:9 * 0:3,13:9} |
| AGENT: | IBM | {0:3 } |
| ACQUIRED: | Microsoft | {13:9} |
| EVENT TYPE: | MNA | {0:3,4:8,13:9} |
| EVENT DESC: | IBM acquired Microsoft | {0:22} |
| EVENT SENTENCE: | IBM acquired Microsoft | {0:22} |
| <ORGANIZATION-NIL-1> | | |
| NAME | Microsoft | { 13:9 } |
| TYPE: | COMPANY | { 13:9 } |
| ALIASES: | Microsoft | {13:9} |
| <ORGANIZATION-NIL-2> | | |
| NAME: | IBM | {0:3} |
| TYPE: | COMPANY | {0:3} |
| ALIASES: | IBM | {0:3 } |

In another exemplary template 1310, the system 1100 extracts information from newspaper articles about high-level management changes in private companies. From a single sentence: "Penelope Muse Abernathy, 41, the Times newsroom business manager, was named vice president, planning, a new post", the system 1100 is to extract information relating to management changes. The desired information on management changes, can be represented as transitions with a start state and an end state. Each state, in turn, has three main elements: a person, a position, and an organization (company). Using this example, transitions come in two flavors:

(1) PERSON-PIVOT: wherein the person in each of the two states is the same, but where at least one of position/organization change; and (2) POSITION-PIVOT: where the position-company are the same, but the person who fills that position changes.

Figure 15:
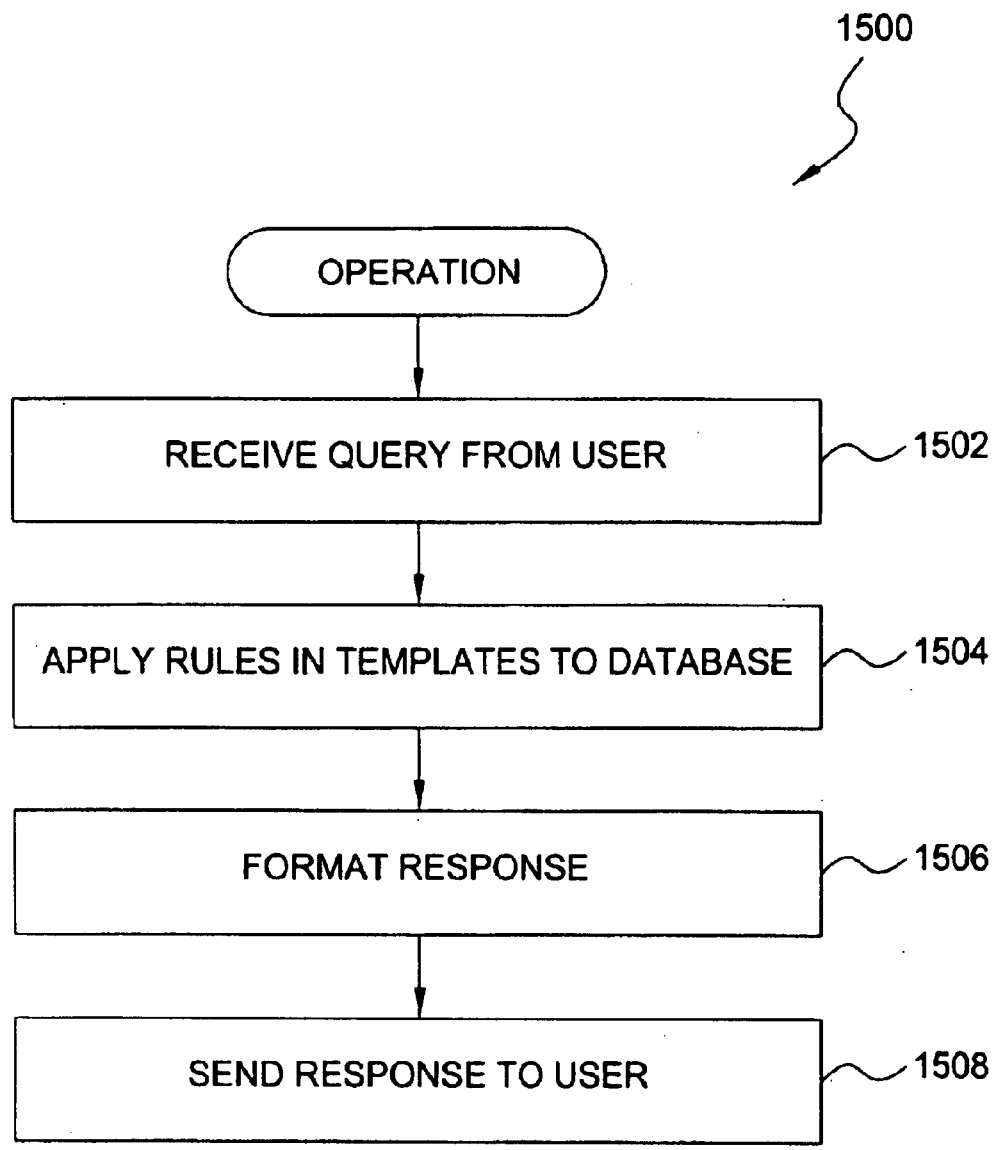
FIG. 15 is a flowchart illustrating a process for operating the system of FIG. 11.

Referring now to FIG. 15, a process 1500 illustrating the usage of the system of FIG. 11 is detailed. First, the user submits a natural language query to the system 1100 (step 1502). As discussed earlier, an exemplary natural language query can be "Tell me about joint ventures involving SBC in the Communications Services Sector" or "Did Barnes & Noble buy anyone this year?" The natural language query is parsed by the natural language user interface 1110. A variety of natural language parsers can be used. In one embodiment, the natural language interface 1110 executes one or more query grammar files which are analogous to the grammar files 1310 associated with the search system 1100. The output from executing the query grammar files is used to generate database queries with one or more search parameters corresponding to the natural language queries.

Although a natural language query interface is shown in FIG. 15, a menu-driven interface can also be used to request information. A typical query would request information on a specific topic (such as mergers, joint ventures, etc.), pertaining to a specific participant (companies such as Chevron or sectors such as the Integrated Oil Section), and within a given period. The menu-driven interface allows the user to enter these parameters directly into pre-specified fields. For example, the menu-driven interface can have a field called topic where the user can enter "joint ventures" and a second field called company name where the user can enter "Chevron."

Once the system 1100 receives a natural language query from the user, natural language rules are applied to understand the specific goals of the question: the topic area, the type of information sought, and any specific constraints (step 1504). This is accomplished by interpreting the user's natural language query based on the grammar files generated in step 1214 of FIG. 12. The information derived from this interpretation is used to generate a database query which is submitted to the information cache (typically a database, or modified search engine). The information cache returns an output associated with the query. The result is then formatted (step 1506). The formatting includes highlighting relevant portions of the text as well as summarizing the results in a natural language such as English. Next, the formatted response is sent to the user (step 1508).

Figure 16:
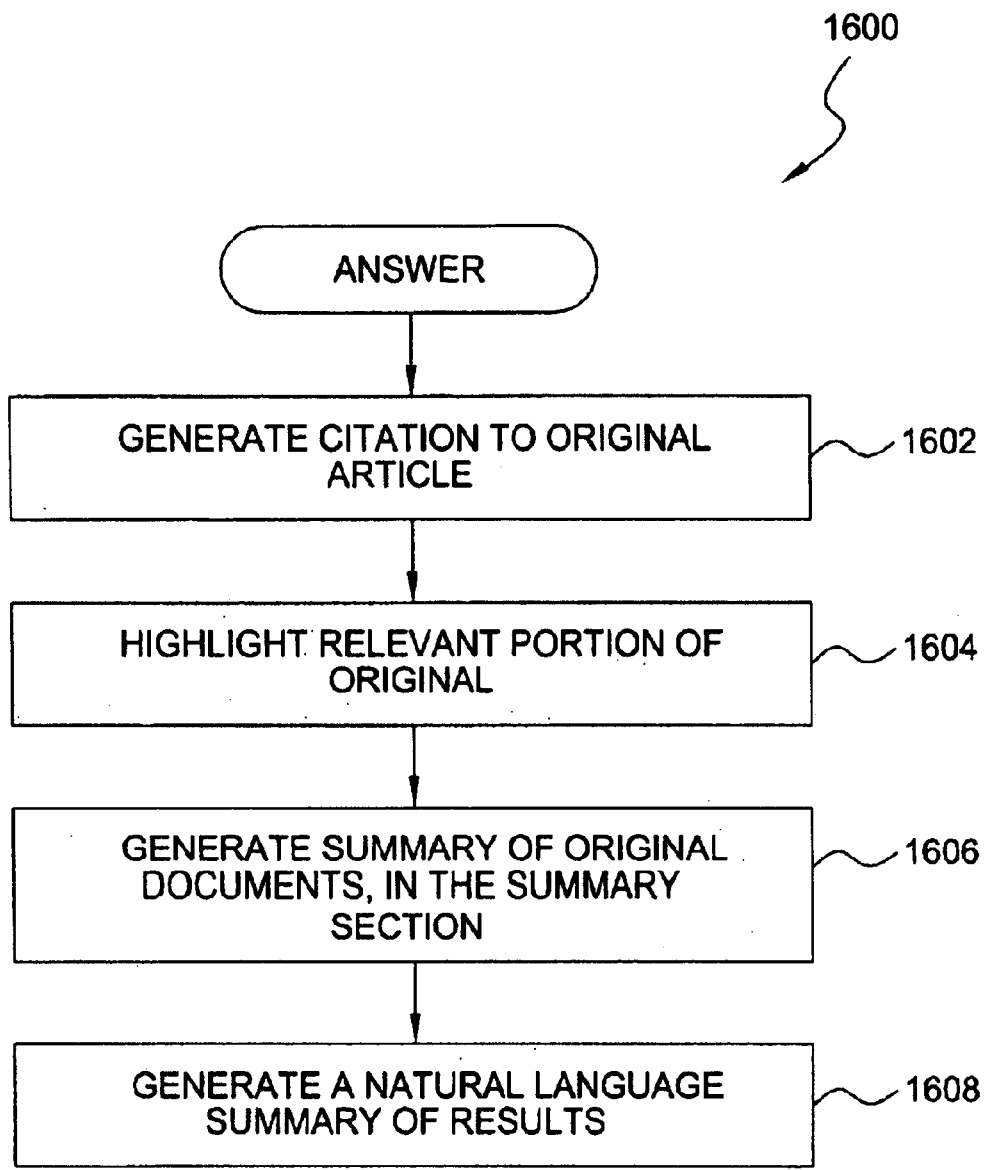
FIG. 16 is a flowchart illustrating a process for using a natural language summary of the output of the system of FIG. 11.

FIG. 16 illustrates a process 1600 for formatting an answer to a query. The process 1600 generates a citation to the original article (step 1602). The citation may be in the form of a hyperlink. Additionally, the process 1600 highlights one or more relevant portions in the original article (step 1604). The process 1600 then generates a summary of the original document in the summary section (step 1606). Finally, a natural language summary of results found in response to the search is generated (step 1608). In this manner, the system succinctly answers the user's query, and links are provided to allow the user to view the entire source document, if desired.

The output of the process 1600 is illustrated by an example, shown in more detail in FIGS. 17–18. As illustrated in FIGS. 17–18, a user looking for information relevant to the topic of joint ventures can pose a natural language question, (e.g., "Tell me about joint ventures involving SBC in the Communications Services sector") in a text input box 1700. The query is analyzed and a query is submitted to the database 1109 in the information extraction engine 1108 (FIG. 11).

The distilled result is provided to an output box 1702: First, a short summary box 1704 is shown illustrating a particular group of search results, in this case a group of documents (shown with one document) involving Telefono de Mexico S.A. de C. V. and SBC. The response to the question takes the form of a brief phrasal summary of the information (e.g., "Joint Ventures involving Telefonos de Mexico S.A. de C.V. and SBC Communications Inc.") in the summary box 1704.

The full article can be retrieved by clicking on the hyperlink in a box 1706. When the hyperlink in the box 1706 is clicked, the full article is retrieved and is shown in FIG. 18. Particularly, a section 1800 relevant to the inquiry entered into the box 1700 of FIG. 17 is highlighted. That way, the user can quickly review the section of the text that is most pertinent to his or her search request. In this example, citations from the texts of the relevant passages (e.g. "New York Times, Fri. 14 May 1999 13:21:59 PDT: . . . The announcement also noted that SBC had formed a joint venture with Telefonos de Mexico S.A. de C.V. ('Telmex') to effect the acquisition . . . ") are shown in the box 1706. The citation itself is a hyperlink pointing to the source texts, in which the relevant sections are highlighted.

In one embodiment, the language of the natural language query can differ from the language of the searchable documents as well as the language of the natural language reply. For instance, a German user can enter a natural language query in German. The German query can be parsed by a grammar set up to parse German queries, and the resulting query can be applied to documents that can be in Japanese, English, and German, or any other languages. The result of the search can then be summarized in German for the user to review.

Figure 19:
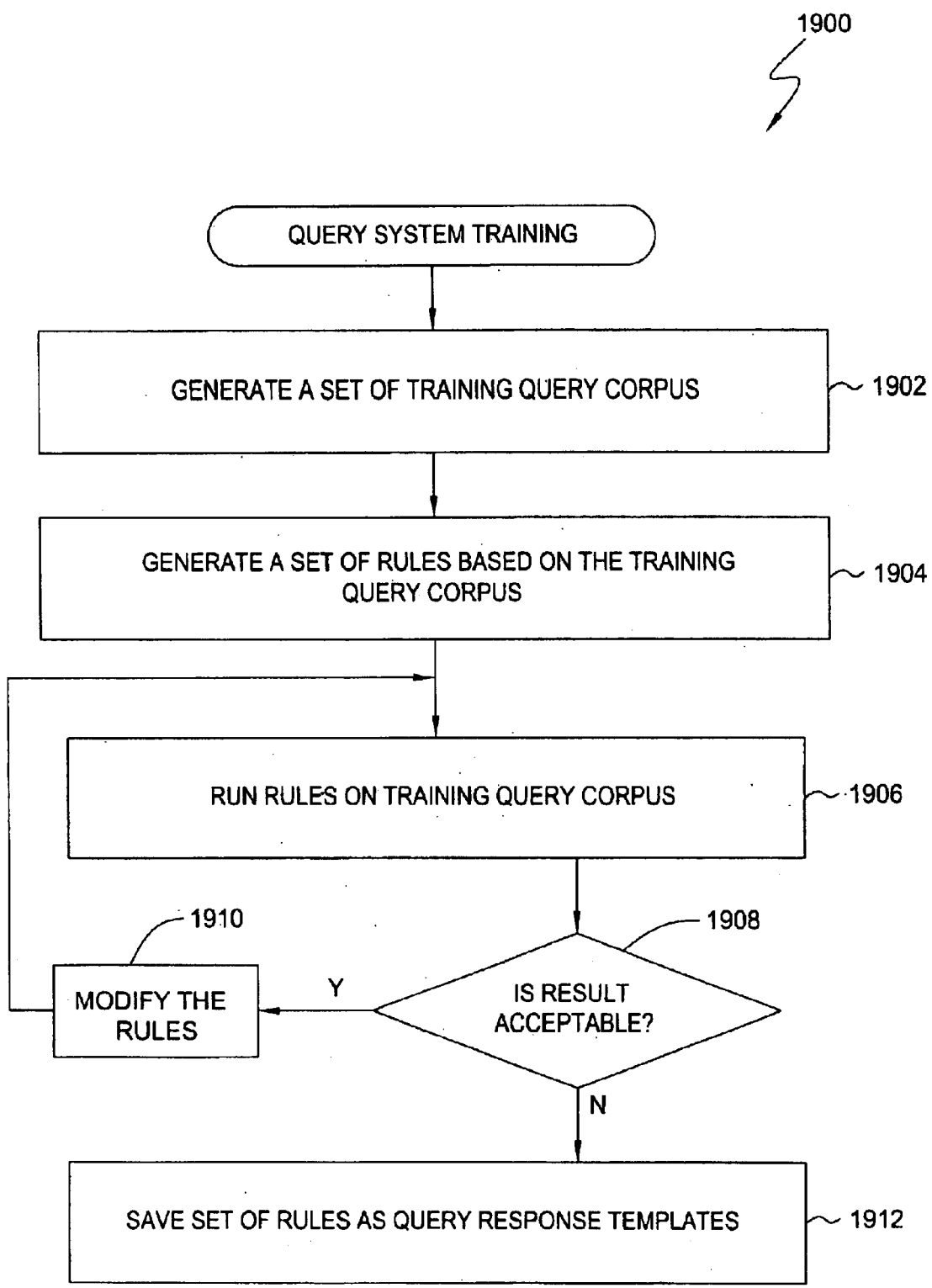
FIG. 19 is a flowchart illustrating a process for setting up a system for passing natural language queries.

FIG. 19 illustrates a process 1900 for training the natural language user interface 1110 of FIG. 11. The process 1900 is a variant of the process 1200 of FIG. 12, except that the process 1900 is specific to various natural language queries that a user may enter. The process 1900 produces a set of rules which identify in advance various natural language queries that users are likely to use. The rules are distilled in one or more query grammar files, which are invoked in response to a query. The grammar files are used to generate one or more database queries, which are submitted to a query database (not shown). The query database in turn generates one or more search parameters which are submitted to the information extraction engine 1108 (FIG. 11).

Turning now to FIG. 19, a corpus of training queries is generated (step 1902). The corpus may be captured from natural language queries submitted from user search sessions and classifying the natural language queries into a set of rules (step 1904). The rules are then executed on the training query corpus (step 1906). The rules are tested to see how well they handle the queries (step 1908). If the result is not acceptable, the rules are then updated (step 1910) and the updated rules are then executed on the training query corpus (step 1906). From step 1908, if the results are acceptable, the set of rules are saved as one or more query grammar files (step 1912).

Figure 20:
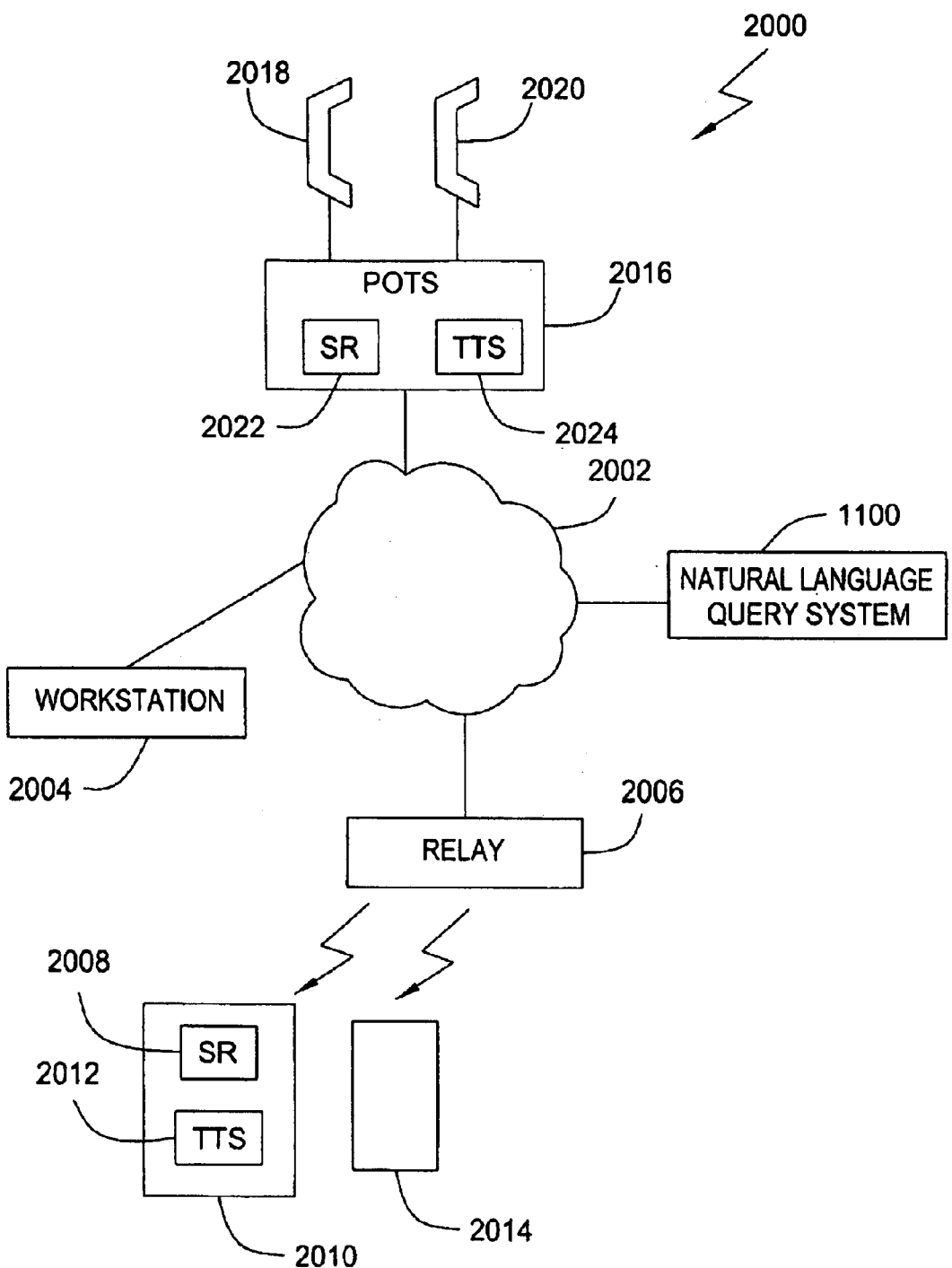
FIG. 20 illustrates one exemplary operating environment for the system of FIG. 11.

FIG. 20 shows an exemplary operating environment for the system of FIG. 11. In FIG. 20, the natural language query system 1100 is connected to a network 2002. The network 2002 can be a local area network or a wide area network such as the Internet. One or more workstations 2004 are connected to the network 2002. A user can enter a natural language query or other suitable search parameters into a software application, such as a standard Internet browser. The query or search parameters are then communicated from the workstation 2004 to the system 1100 over the network 2002.

Additionally, to serve mobile users, a relay station 2006 is connected to the network 2002. The relay station 2006 communicates with mobile devices such as handheld computers 2010 and 2014. The communication between the relay station 2006 and the remote computers 2010 and 2014 may be performed wirelessly using radio transmissions or optically using infrared beams, among others.

Each of the mobile devices or handheld computers 2010 and 2014 has a processor, memory, a small display, a data storage device, and suitable input/output devices such as a pointing device, a keyboard, a microphone, a speaker, and parallel/serial/infrared ports, among others. The handheld computers 2010–2014 can include the 3Com Palm, HP 1200 LX, the Psion 3a, the Sharp Zaurus, and Windows CE handheld units. Instead of a mouse or other pointing device, the display can provide a resistive touch surface. This lets the user use a simple plastic stylus or a finger to select various on-screen objects.

Each user query or search parameter can be entered using the keyboard or pointing device of the handheld computer 2010 or 2014. Alternatively, the user can verbally instruct the handheld computer 2010 or 2014 with the query or search parameter. In this case, the handheld computer 2010 or 2014 can execute a speech recognizer 2008 that maps the user's voice to a set of reference patterns representing the phonetic and phonological descriptions of speech previously obtained from training data. In order to perform this mapping, signal processing techniques such as Fast Fourier Transforms (FFT), Linear Predictive Coding (LPC), or filter banks can be applied to a digital form of the speech signal to extract an appropriate parametric representation of the speech signal. A commonly-used representation is a feature vector containing for each time interval, the FFT or LPC coefficients that represent the frequency and/or energy bands contained in the speech signal.

A sequence of these feature vectors is mapped to the set of reference patterns which identify linguistic units, words and/or sentences contained in the speech signal. The speech recognizer can also run probabilistic models and statistical techniques to predict the intended message. One such technique deploys Hidden Markov Models (HMMs) that determine the reference pattern that will more likely match the speech signal rather than finding an exact match.

Once the system 1100 returns text associated with the query, the text can be shown to the user on the display. Because the system 1100 provides a concise summary along with documents that are responsive to the query, the user can easily review the resulting text on the small display of the handheld computer.

Alternatively, the result can be provided to a text-to-speech (TTS) system 2012 which translates the text to speech for the user to hear. The TTS system 2012 looks up each word in a dictionary and causes a sequence of natural speech segments to be played on a speaker. The sequence can be a sequence of phonetic segments as well as diphones, or units that contain the transition between two adjacent phonetic segments. A suitable TTS system is the Bell Labs TTS system, among others. Through the speech recognizer 2008 and the TTS system 2012, the handheld embodiment of FIG. 20 supports alternative modes of input and output to the handheld computer to allow users access to information that is most important to them, at any time and from any location.

Additionally, to serve mobile users who have access to the public telephone network, a plain old telephone service (POTS) station 2016 may be connected to the network 2002. The POTS station 2016 supports handsets 2018 and 2020. As each user speaks into the handset, user speech is forwarded to the POTS station 2016. A speech recognizer 2022 at the POTS station 2016 converts the speech to text and forwards the text to the natural language query system 1100. Responses from the natural language query system 1100 in turn is provided to a text-to-speech unit 2024 which converts the answers to spoken language suitable for delivery over the telephone network. In this manner, the handset embodiment of FIG. 20 supports ubiquitous computing by allowing natural language searches, even if the user does not have access to a computer. As in the case of handheld computers, the results provided by the system 1100 are concise and accurate so that the outputs of the system 1100 can be communicated over the telephone. The handset embodiment of FIG. 20 supports ubiquitous computing by allowing natural language searches, even if the user does not have access to a computer. As in the case of handheld computers, the results provided by the system 1100 are concise and accurate so that the outputs of the system 1100 can be communicated over the telephone.

Figure 21:
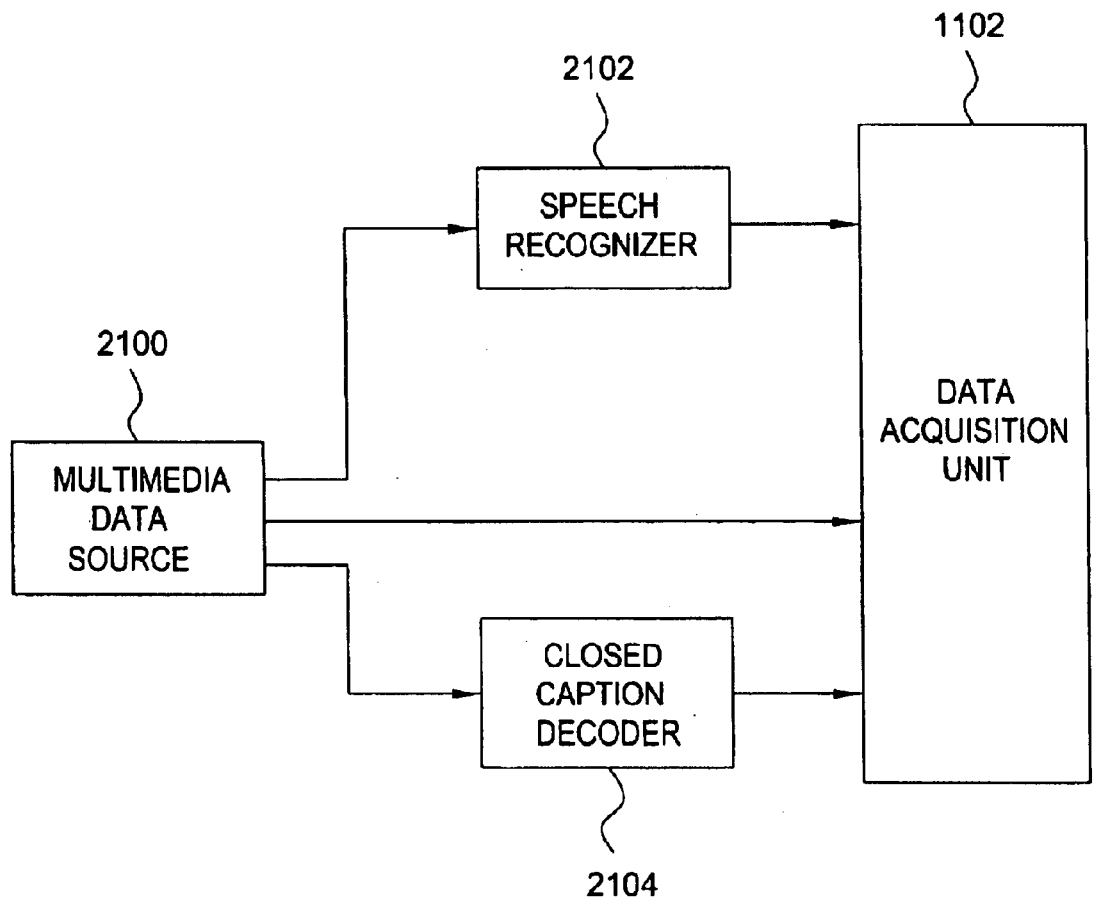
FIG. 21 is a diagram illustrating one embodiment to acquire multimedia data for a data acquisition unit of FIG. 11.

FIG. 21 shows one embodiment for providing data to the data acquisition unit 1102 of FIG. 11. In FIG. 21, a multimedia data source 2100 provides a stream of multimedia data. The stream may be a video stream, a sound stream, or others. The output from the multimedia data source 2100 is provided to the data acquisition unit 1102. Additionally, a speech recognizer 2102 and a closed captioned decoder 2104 is connected to the multimedia data source. Although the system of FIG. 21 shows both the speech recognizer 2102 and the closed caption decoder 2104, the system of FIG. 21 can still operate with only one of the two units present.

Since the operation of the speech recognizer 2102 is already discussed, it will not be repeated here. With respect to data sources with closed-captioning, the closed caption decoder 2104 generates a word-for-word transcript from a television, VCR, DSS or DVD program. The closed caption decoder 2104 deciphers text information embedded in closed-caption transmission. The text data is stored in line 21, field 1 of a video signal's vertical blanking interval (VBI). The information contained in line 21 contains not only raw data but also timing information. After a timing interval which contains a "color burst", a start bit followed by 16 bits of digital information transmitted as two 8-bit words formatted per the USA Standard Code of Information Interchange (USASCII;x3.4-1967) with odd parity. The closed caption decoder 2104 converts the 8-bit words into text and deliver the text to the data acquisition unit 1102. A variety of decoders can be used, including units deploying the MC144143, available from Motorola Corporation in Phoenix, Ariz. Alternatively, stand-alone units such as the TextGrabber decoder, available from SunBelt Industries Technologies Group, Inc., Jacksonville Beach, Fla., can be used to convert the closed captioned information contained within a television or video signal to text for the data acquisition unit 1102.

In addition to speech recognition and close-caption decoding, words appearing in an image can also be extracted using a suitable optical character recognition (OCR) software. Such OCR software looks for captions that naturally appear within the video stream. Additionally, the OCR software can be trained to extract text appearing in the background of the video stream.

The text generated by the speech recognizer 2102 and the closed caption decoder 2104 is used for cataloging, searching, and retrieving the corresponding video stream. The text extracted from the video stream, along with a time-stamp, is provided to the information retrieval engine and suitably indexed so that when the text is found to be responsive to a particular natural language query, the time-stamp can be used to retrieve the corresponding video stream. Further, audio time stamps can be aligned with time-stamps associated with the processed video stream for subsequent retrieval.

During operation, users can search for video clips by entering a natural language query or specific search terms. In response, the system provides distilled answers to the queries, a list of responsive video clips and concise summaries of the search results. In one embodiment, each clip is identified by a representative keyframe and descriptive text such as annotations, closed caption text or speaker identification. Users can click on one or more links to watch the video clips responsive to the queries and perform a number of built-in actions, such as forwarding the video clip to another user or cutting/pasting the clip into standard enterprise productivity tools such as presentation software, word-processing software, database software or spreadsheet software. In this manner, the embodiment of FIG. 21 supports a highly scalable and searchable video repository whose content can be continuously updated.

Figure 22:
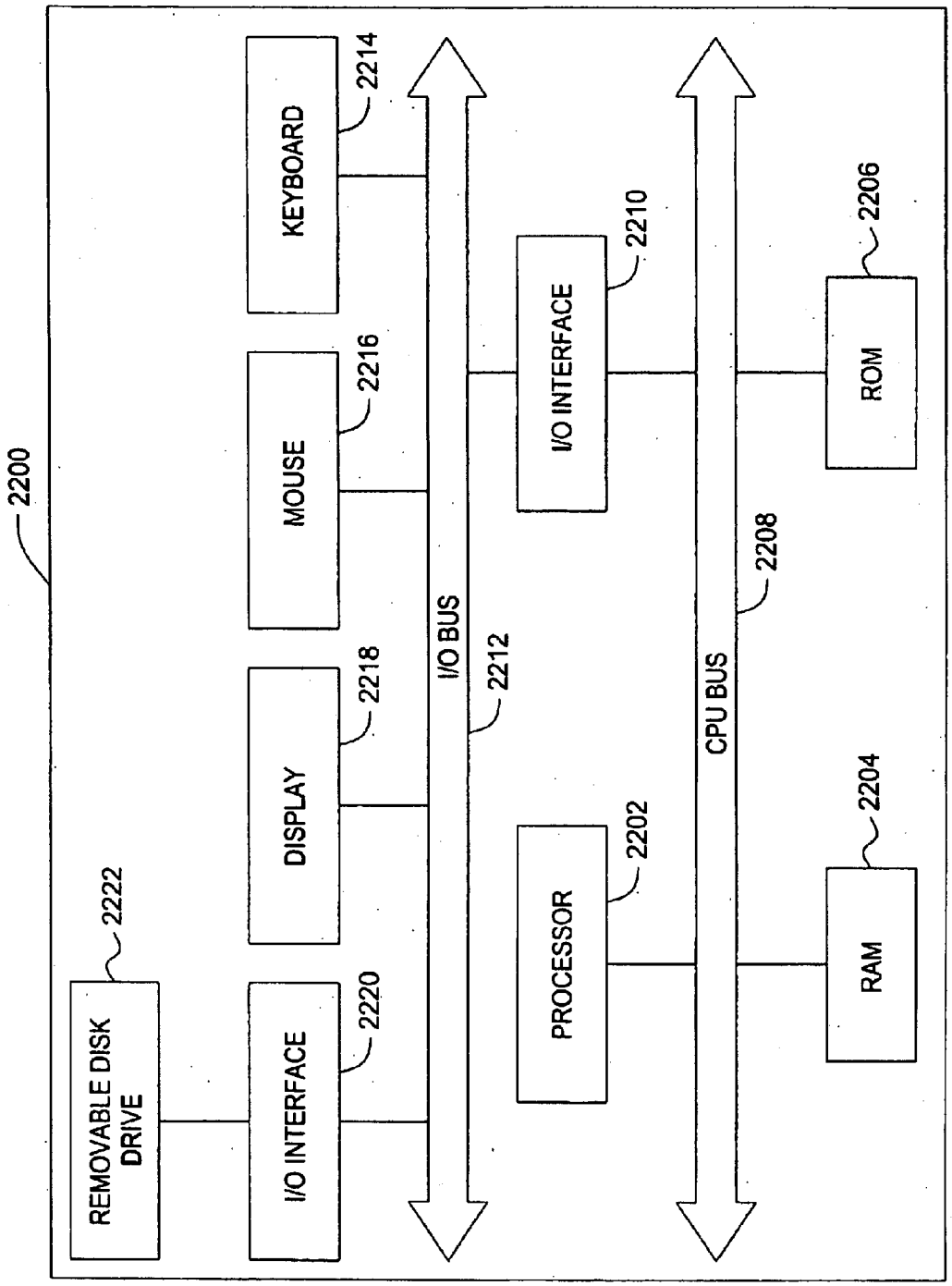
FIG. 22 is a diagram illustrating an exemplary computer system capable of supporting the system of FIG. 11.

The invention may be implemented in digital hardware or computer software, or a combination of both. Preferably, the invention is implemented in a computer program executing in a computer system. Such a computer system may include a processor, a data storage system, at least one input device, and an output device. FIG. 22 illustrates one such computer system 2200, including a processor (CPU) 2202, a RAM 2204, a ROM 2206 and an I/O controller 2210 coupled by a CPU bus 2208. The I/O controller 2210 is also coupled by an I/O bus 2212 to input devices such as a keyboard 2214, a mouse 2216, and output devices such as a monitor 2218. Additionally, one or more data storage devices 2222 is connected to the I/O bus via an I/O interface 2220.

Further, variations to the basic computer system of FIG. 22 are within the scope of the present invention. For example, instead of using a mouse as user input devices, a pressure-sensitive pen, digitizer or tablet may be used.

The above-described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner. Other embodiments are within the scope of the present invention.

Fastspec Grammar Specification Language

The grammar specification metalanguage uses the following metacharacters:

==> rewrites to
( ) optional
* zero or more iteration
+ one or more iteration
{ } for grouping
I alternatives
" single quotes enclosing literals, e.g. 'ATOM' (using \'for')
% comment til the end of the line, to be ignored at compilation
[0–9] any of the digits from 0 to 9
[A–Z] any of the upper-case letters from A to Z
[a–z] any of the lower-case letters from a to z The following are the basic data types: number, atom, Boolean, string, and word-list-name.

integer=>[0–9]+a sequence of numeric characters
    number==>integer ('.' integer)

An atom is a sequence of any alphanumeric characters, hyphens, slashes, underscores, question marks, and exclamation marks. No more than one hyphen or slash in a row is allowed, and an atom cannot end with a hyphen or a slash. The atom must begin with an alphabetic character, an underscore, a question mark, or an exclamation mark.

letter==>{[A–Z]I[a–z]I'-'I'?'I'!'}
    digit==>[0–9]
    separator==>{'-'1'/'}
    atom==>letter{letter I digit}*{separator{letter I digit}+}*

Case in atoms in the grammar specifications is never significant. So SYMBOL, Symbol and symbol are the same. (It would be disastrous to make a distinction between NG and Ng.) However, it is good practice to be consistent.

boolean==>{'T' I 'F' I 'NIL'} a special subtype of atom

A string is a sequence of any characters (using \'1 for 1') between double quotes, e.g. "abcdef.3\"&"

string==>'1'1 charseq 1"1
    charseq==>{[A–Z]I[a–z]I[0–9]
        1'!'II@'I'#'I'$'I'III\II'&II'*'I'('I')'
        1'-'II-'I'+'I'='II'-II'{'I'['"']'I':'I';'I'\'"'I'<'1'>'",
        '1'.11'?"'/'1"}*

In addition, a charseq can include a single quote or apostrophe.

The convention in the five principal grammars will be that a lower case letter in a string in a rule will match with the same letter in the text in upper or lower or unknown case. Thus, "apple" in a rule will match with "Apple" in the text. However, an upper case letter in a rule will only match with an upper or unknown case in the text. Thus, "Apple" in a rule will not match with "apple" in the text.

Note that strictly speaking a specification "apple"[case= ~lower] is inconsistent. We assume the way the system will interpret it is that the string "apple" in the rule will match the string "apple" in the text, but that then the check of features will rule out the match.

A word-list-name is an atom surrounded by dollar signs. It is used below to point to lists of words.

word-list-name==>'$' atom '$'

Whitespace characters in the following rules are ignored unless they are enclosed in double quotes. Different numbers and atoms must be separated by whitespace; thus, AB is the atom AB, not the two atoms A and B.

Grammar Definition

'END-OF-GRAMMAR' punctuates between GRAMMAR-PARTS

GRAMMAR==>GRAMMAR-PART {'END-OF-GRAMMAR' GRAMMAR-PART}*

GRAMMAR-PART==>
'Name:' atom';'
('Input Type:' atom (attribute-type-decls) ';')
('Output Type:' atom (attribute-type-decls) ';')
('Root Category:' nonterminal-category-name {','nonterminal-category-name} * ';')
('Valref-functions:' function-name {',' function-name} * ';')
{'Instantiate' (rule-specifiers) 'Rules' ('Except' rule-specifiers) 'By' bindings ';;'}* 'Rules:' RULE+('END-OF-RULES')

input type, output type, external attributes and root category can be given in any order rules can also be interspersed with declarations if followed by END-OF-RULES Name will be something like Preprocessor or Parser. It should be possible to specify the types of the values of the attributes. This is a provisional list of possible types. The types of input and output objects should normally be declared in the grammar part.

Attribute types can optionally be declared to enable run-time type checking of attribute values. The root category identifies the top level rules for this grammar part. The default root category is START.

(The Root Category declaration now allows multiple rule names)

(There is no longer any syntactic restriction on Root Category rules)

Valref-functions can also be declared. Valref-functions will be passed valref (value+reference information) arguments rather than just values.

Instantiation declarations support a mechanism in the grammar compiler to instantiate rules by sets of variable values. Any rule that contains one or more binding-vars will be instantiated in all possible consistent ways by the set of instantiations defined by 'Instantiate ... Rules ... By ... ' declarations.

attribute-type-decls==>'(' attribute-type-decl {','attribute-type-decl}* ')'
attribute-type-decl==>attrib ':' {attribute-type I attribute-type 'LIST' I attribute-type 'FUNCTION'}
attribute-type==>atom including ATOM, STRING, INTEGER, NUMBER, BOOLEAN, LIST, ALIST
rule-specifiers==>rule-specifier {',' rule-specifier} *
rule-specifier==>{rule-identifier I nonterminal-category-name}
bindings==>binding {'&&' binding}*
binding==>binding-var ,=, binding-value
binding-var==>atom an atom whose first two characters are '??'
binding-value==>everything up to the next '&&' or ';;' (not allowed to contain binding-vars)

Rule Definition

RULE==>LHS '-->' RHS ';' SEM ';'

It is good practice to leave a space between LHS and -->.

Rules should not be recursive. There should be no cycles. If there are the grammar is no longer necessarily finite-state, and such rules may not be supported by the implementation.

Syntax Specification Language

Grammar Start State

In any particular phase processing, there is a sequence of input objects, and a sequence of output objects is constructed out of them.

We assume a set of predefined attributes on the input and output objects, namely, cat, string, start, end. cat is the category of the object. string is the text string that the rule matches. start and end are pointers into the test to the places where the string starts and ends. string, start, and end are set automatically and do not need to be explicitly specified, Priorities: Higher numbers for higher priority, defaults to 0

LHS==>(rule-identifier ':') nonterminal-category-name ('['('-') priority ']')

rule-identifier==>atom nonterminal-category-name==>atom priority==>integer specify ,-, priority for negative priority Rules can optionally have a rule-identifier that can be used to identify the rule for tracing.

If two or more rules have the same rule-identifier, only the last such rule is used. This allows the grammar to be modified by adding the changed rules at the end. 11 is also possible to effectively delete a rule by using <<fail>> as its RHS.

An example of the use of PRIORITY.

ADJ(1]-->"state" 1'-'1 "owned"; state=t;

ADJ-->N "-" V-En[trans];;

For the phrase "state-owned", the first rule applies, not the second.

RHS

RHS==>('#' LOOKBACK TERM {'I' LOOKBACK TERM}*1#')

TERM+
  ('#' LOOKAHEAD-TERM {'I' LOOKAHEAD-TERM}* '#')

LOOKBACK-TERM==>TERM1

LOOKBACK-TERM==>'START OF INPUT'

LOOKAHEAD TERM==>TERM1

LOOKAHEAD TERM==>'END OF INPUT'

The hash marks specify that TERM 1 is to be matched but not consumed. This gives us one-symbol look-ahead or look-back. Its use is discouraged.

If START-OF-INPUT END-OF-INPUT is specified, then there must be no more symbols in the input.

TERM==>TERM '*' zero or more occurrences

TERM==>TERM '+' one or more occurrences

TERM==>'{'TERM+{'1' TERM+}*,}, grouping with possible alternatives

TERM==>,('TERM+{'1' TERM+}*,)' optional grouping with possible alternatives

TERM==>,<, TERM TERM+'>' optional sequence macro

The expression <TERM1 . . . TERMn> is equivalent to {TERM1 (TERM2) . . . (TERMn) I TERM2 (TERM3) . . . (TERMn) I . . . I TERMn}

TERM==>TERM ':' label a label must be an integer (This is a new restriction)

label==>integer >0

Labels are used by semantics to refer to input objects when the reference to them by category would be ambiguous. They are also used to refer to nonatomic terms, such as alternations. When a label is applied to an alternation, the label refers to the LAST constituent of the selected disjunct. E.g., in {A I B C}:1, the label 1 refers to either A or C, depending on which alternative was matched with the text.

Labels should be used only with terminal symbols or disjunctions of terminal symbols. If not, they will default to the most recent input object matched.

Labels cannot appear inside iterations * or +.

TERM==>TERM 1

TERM 1==>CA T ('[' A TTRS ']')

CAT==>{string I word-list-name I terminal-category-name} terminal-category-name==>{atom I 'Any'}

A special atom Any matches any category

TERM==>nonterminal-category-name ('[' A TTRS ']') allowing ATTRS to be specified for nonterminal categories is new the attribute restrictions are applied to the last input object matched by the rule; fails if no input objects were matched TERM==>r<<'SET-A TTR'>>r

TERM==>FUNCTION-CALL

As an escape hatch when the semantics of this language proves too restrictive, calls to arbitrary functions can be made at any point in the rule. The conventions for function calls are described below. Similarly, the attribute setting functions described below can be explicitly placed in the rule and will be applied when that point is reached in the rule.

ATTRS

ATTRS==>ATTR1 {','ATTR1}*{'I' ATTR1 {','ATTR1}*}* an A TTRS in its most general form is a disjunction of conjunctions of ATTR1s

A TTR 1==>attr implicit value T

ATTR 1==>'~' attr negation

ATTR1==>'('ATTRS')' parenthesization allowed attr==>{feature-name I string I word-list-name} feature-name==>atom

Top-level conjunction and disjunction of attributes are allowed, but no nested conjunction or disjunction.

Constraints on transitions

ATTR1==>attrib {'<'1'>'1'<=1 1'>='} number

ATTR1==>attrib {'1'='1'!=1 1'=-'} VAL1 with a specific value

Two varieties of equals and not-equals are provided because tastes differ. There is no ambiguity between=used in conditions and=used in assignments, since conditions occur only in the syntax and assignments only in semantics. The symbol=is provided because it is very natural to say things like Word[case=-lower]

value types for attributes may be declared at the top level

VAL 1=>{atom I string I number I boolean}

We may later want to introduce another kind of value, the entity: VAL 1==>entity The entity data structure is notated as, e.g., '^PERSON', '^COMP ANY', etc. entity==>'^' atom

Semantics Specification Language

SEM==>{{SET-A TTR I FUNCTION-CALL}';'}*

SEM can be empty, RULE ends with ';;'

SET-A TTR==>attrib ,=, VAL attrib==>{attribute-name I attribute-name '.' field-name} attribute-name==>atom field-name==>atom

This expression causes the value of the attribute attrib of the output object to be set to VAL.

VAL==>{VAL 1 I VAL2}

VAL1 is given above. These are the possible constant values.

VAL2 allows us to set the value of an attribute of the output object to information derived from input objects and their attributes. There are various ways to refer to the input object corresponding to a particular constituent in RHS: the category alone, the label alone, and the category and label together. Whatever is used must refer UNAMBIGUOUSL y to some object in the RHS.

VAL2==>'('attrib label')'
VAL2==>'('attrib 'OUTPUT' ')'
VAL2==>'('attrib 'OUTPUT' label ')'
VAL2==>'('attrib 'OUTPUT' 0 ')'

There is a special attrib OBJ that refers to the input object corresponding to that constituent in the RHS. Thus, in A>B:1C; attr1=1; attr2=(OBJ I); attr3=C; attr4=(OBJ C);;

attr1 is set to the integer I, attr2 is set to the input object matching B in the rule, attr3 is set to the atom C, and attr4 is set to the input object matching C in the rule.

'OUTPUT' is taken to be a reference to the output object being constructed. This was previously, less mnemonically specified by 'START'. (ATTR OUTPUT 2) can be used to refer to the value of the ATTR attribute of the output object at label 2, i.e., the attribute value of an earlier version of the current output object.

When a category is referenced that does not exist, e.g., an alternative not taken or an optional element not present, the neutral value for the type of output object attribute is returned, e.g., the empty string "" for strings, 0 for numbers. NIL for booleans, atoms and lists.

Very often it is desired to combine the information from successive input objects. This is done with an operator COMBINE. NOTE: So far, COMBINE has not been used extensively in grammars. The interpretation of COMBINE depends upon its arguments.

VAL2==>'(''COMBINE' VAL+')'

If VAL is a number. COMBINE means ADD
If VAL is a string, COMBINE means CONCA TENA TE
If VAL is a boolean. COMBINE means OR
If VAL is an atom or list COMBINE means APPEND The last of these means that (COMBINE (A) B (C D)) is (A B C D). CONCA TENA TE is assumed to be smart about blanks and hyphens. The VALs should all be of the same type, but if an attempt is made to COMBINE a number and a string, the number is coerced into the corresponding string. Otherwise if two incompatible types are combined, a list of them is formed.

If one desires a list of numbers, strings, and/or booleans, LIST should be used. For atoms and lists, LIST and COMBINE are the same.

VAL2==>'(''LIST' VAL+')'

The meaning of COMBINE and LIST for complex expressions can be defined recursively, as follows:

(COMBINE VAL1)=VAL1
(COMBINE VAL1*a* VAL1*b*)=(ADD/CONCA TENA TE/OR/APEND VAL1*a* VAL1*b*)

If the sequence A B occurs in RHS, then
(COMBINE A B)=(COMBINE (COMBINE A) (COMBINE B))

If the labeled alternation {AIB}:1 occurs in RHS, then
(COMBINE 1)=(COMBINE A) or (COMBINE B), whichever alternative was chosen If the iteration A* occurs in RHS and is matched by the sequence A1 A2 . . . , then
(COMBINE A)=(COMBINE (COMBINE A1) (COMBINE A2) . . . )

For alternation with '1' when explicit reference to constituents is needed:

VAL2==>'(''SELECT' label VAL+')'

The alternation in RHS must be labeled with label and there must be as many VALs as there are alternatives. The VAL is chosen corresponding to the alternative matched in RHS. Use of SELECT can generally be eliminated by splitting rules.

Finally, as an escape hatch, it is possible to call an arbitrary function.

VAL2==>FUNCTION-CALL
FUNCTION-CALL==>'<<'function-name argument*'>>'
function-name==>atom
argument==>VAL VAL above
argument==>keyword
keyword==>':' atom Functions are required to be free of side-effects, i.e., they are not allowed to modify their arguments, the current output object, etc. They should only be used to compute values used in assignment operations or as predicates to accept or reject parses. The only allowable structure-modifying operation is the use of the=assignment operation (described by SET-ATTR) for assigning a value to an attribute of the current output object.

The atom OUTPUT as argument of an attribute refers to the output object being built. Thus. (STRING OUTPUT) refers to the string attribute of the output object; (OBJ OUTPUT) refers to the whole output object; OUTPUT is just the atom OUTPUT. If the atom -FAIL-is returned by the function, the rule fails.

The functions PROCEED-WHEN, PROCEED-UNLESS, FAIL-WHEN, and FAIL-UNLESS can be used to convert the true/false (i.e., non-NIL/NIL) values of ordinary predicates to success/failure. For example, <<PROCEED-WHEN<<EQUAL X Y>>>> succeeds if(EQUAL X Y), fails otherwise;
<<PROCEED-UNLESS<<EQUAL X Y>>>> succeeds if (NOT (EQUAL X Y)), fails otherwise;
<<FAIL-WHEN<<EQUAL X Y)>>>> fails if(EQUAL X Y), succeeds otherwise,
<<FAIL-UNLESS<<EQUAL X Y>>>> fails if (NOT (EQUAL X Y)), succeeds otherwise.

PROCEED WHEN and PROCEED-UNLESS were formerly named

SUCCEED-WHEN and SUCCEED-UNLESS

Language Processing Using Flat Structures

Introduction

Dialogue utterances are rarely sentences and are often fragmentary. This section discusses some of the implicit assumptions made by shallow and deep processing approaches, and advocates a new approach which keeps the robustness of shallow or keyword-based approaches, whilst retaining the generality and formal nature of a full semantics, according to an embodiment of the present invention.

The ideal spoken dialogue system should be flexible, allowing users to supply extra information from that specifically asked for, or to take the initiative. However, these aims can be difficult to square with the need for top down expectation to help speech recognition accuracy. Thus there tends to be a divide between tightly constrained systems with e.g. separate finite state grammars to recognize uses responses to particular system queries, and unconstrained systems which rely on keyword spotting/pattern matching, or attempt deep language analysis. In this paper we will try to bridge various divides between shallow and deep processing systems and show how top down expectation from dialogue context can still be incorporated in a flexible system. The key to the approach is to use a 'flat' representation where information about the semantic (or syntactic) structure is distributed between a set of constraints. This makes it possible to combine the robustness we would expect from pattern matching without wasting any available linguistic information concerning constituent structure.

Introduction to Flat Structures

The most basic form of flat structure is just an indexed version of a standard semantic representation. Consider a standard recursively structured piece of semantic representation:

P(a,Q(b,c))

This can be represented as the application structure:

```
    .(.,.)
    /\
  P a.(.,.)
     /\
    Q b c
```

Now consider giving each item in the structure a unique label i.e.

```
  i1:.(.,.)
    /\
 i2:P i3:a i4:.(.,.)
          /\
      i5:Q i6:b i7:c
```

This information can be represented by the set of constraints:

i1 :i2(i3,i4), i2:P, i3:a, i4:i5(i6,i7), i5:Q, i6:b, i7:c

The resulting representation is flat in the sense that there is no explicit recursion. The set of constraints, i2:P, i3:a, i5:Q, i6:b, i7:c describe the lexical/morphological content of the representation. The constraints i 1 :i2(i3,i4) and i4:i5(i6, i7) describe the structural aspects. For example, consider the representation we would might get for the sentence:

John believes Jack runs

The following flat structure corresponds to the logical form, believe(john,run(jack)):

i1 :i2(i3,i4), i2:believe, i3:john, i4:i5(i6), i5:run, i6:jack

This provides the morphemes, believe, john, run and jack along with constraints specifying their relationship.

Note that we have only changed how we represent the semantics: there is a one-to-one mapping between the set of constraints and the original recusive representation (assuming index renumbering). The basic flat structure can be regarded as an alternative notation, or as a description of the original semantic representation.

It should be noted that there are many different varieties of indexed/flat structures, going back at least to Kay 1970. For example, neo-Davidsonian semantics is sometimes described as a flat representation, since event variables act somewhat similarly to indices. The semantics for a sentence such as "John runs at 5 pm" is given by a conjunction of two constraints hanging off an event variable i.e.

::3e. run(e,'j) & at(e,5)

This enables inferences such as "John runs at 5 pm" therefore "John runs" to go through without the need for meaning postulates. Hobbs (1983) extended this approach to all predicates by mapping each n-ary predicate to an n+1-ary predicate including an event variable, thus allowing restrictive modification to be done via conjunctive constraints.

A rather different kind of flat structure (closer to the basic flat structures described above) has been used as a way to provide semantics for fragments which do not form standard constituents (Milward 1991). For example, the semantics of "Mary Fred" in the sentence "John showed Mary Fred or Peter Sue" is treated as the set of constraints, {i4:mary, i5:fred}. An intermediate semantic representation (prior to quantifier and conjunction scoping) uses conjunction or disjunction of sets of constraints e.g. OR({i4:mary, i5:fred} {i4:peter,i5:sue}).

More recently, flat structures which combine both a Davidsonian approach to modification with indexing similar to basic flat structures have been used in Machine Translation (Copestake et al. 1995) following the lexicalist approach of Whitelock (1992) and Trujillo (1995). The prime motivation within Machine Translation is that we can more easily express translation rules which pick up disconnected pieces of the 'source semantic representation and map them to a single piece of the target representation, (or vice versa). Transfer between source language and target language representations is achieved by mapping between a subset of the conjuncts in the source to another set of conjuncts in the target. The translation process is inherently bottom up: we translate subset by subset, and the final set of target conjuncts should comprise a fully connected semantic representation.

Finally, there has also been much interest in using indexed representations for underspecified semantic representation (e.g. Reyle 1993, Egg 1998). Here the emphasis has mainly been on weakening structural constraints to enable underspecified representation of quantifier scope. Structural constraints are divided into dominance, precedence and immediate dominance constraints (similar to the work of Marcus et al. 1983 on the description of syntactic tree structure) making it possible to state that a piece of representation is within the scope of another, without further specifying the relationship.

The interest in flat structures here is motivated by the distributed nature of the representation. There is thus a better chance of achieving robustness when dealing with fragmentary input, or in making rules (e.g. mapping to database slot-values) sensitive to other parts of a representation. To illustrate the former, consider a case where a structural analysis has produced three separate fragments P, a, and Q(b,c). This information can be represented by the set of constraints:

i2:P, i3:a, i4:i5(i6,i7), i5:Q, i6:b, i7:c

This is a subset of the flat structured representations for P(a,Q(b,c)), with only the constraint, i1 :i2(i3,i4) missing. The change of representations thus has the advantage of making the semantics of fragments and full constituents look more similar. We will see that this in turn suggests ways in which rules (e.g. for mapping to database slot-values) can be relaxed to ensure robustness.

Dialogue Systems

Current Systems

Flexible dialogue systems tend to be either based on shallow processing (e.g. keyword spotting or pattern matching) or deep processing (interpretation down to a level of logical or quasi logical form). Shallow systems are task directed, and do not attempt a full semantic or pragmatic analysis of all parts of an utterance, although, processing may be reasonably detailed for the parts relevant to the task. Deep processing systems tend to have a layered architecture e.g.

spoken input
  .recognizer
  n-best list/word lattice
  .syntactic parse/semantic analysis
candidate logical form/quasi-logical form
  .translation
database slot possibilities
  .dialogue manager
integration with current context This is the basis of the architecture of the deep processing component of the SL T system (Boye et al., 1999). The SL T system keeps the top 5 analyses produced by the recognizer to allow later stages of processing to act as a filter on the results of the recognizer. Statistically trained triples (Carter 1997) build in domain dependence to choose the best syntactic/semantic parse. Other systems such as Verbmobil (Kasper et al. 1999, Goertz et al. 1999) and OVIS (van Noord et al, 1999) keep the recognizer lattice, annotating this with syntactic and semantic information.

There is often an assumption that deep approaches will provide better results than shallow approaches in the long term. All we need is more work on our grammars and faster machines. In the meantime we should use multi-engined approaches where you use full analysis wherever possible, but back off to shallow analysis where deep analysis fails (either through time out or lack of coverage). This kind of argument was very much the inspiration for the SL T system and it assumes that when deep analysis provides a result it will generally be better than the result of shallow processing. However, empirical evaluation of the resulting system gave exactly the opposite result. Lewin et. al. (1999) report that when the results of the two analysis modes disagreed, the shallow analysis provided a better result three times as often. One of the inspirations for this paper was to try to see if there might be some theoretical reasons for these results, so let us now consider how various issues tend to be handled by the two kinds of systems.

Requirements for Dialogue Systems

Robustness

Shallow and deep systems tend to tackle the issue of robustness differently. Many shallow approaches home in on words or phrases which are relevant to the task. This means that unknown vocabulary or unknown grammatical constructions will normally have little or no affect on the processing. To give an example, a keyword based approach which only looks for city names should easily deal with an interchange such as:

Where do you want to go?
Well let me see now, um, well I think Boston, yes that's right In contrast, a deep approach will normally come up with a set of possibly overlapping analyzed fragments. There are then two further tasks. The first is to pick the best set of fragments. The second is how to translate the fragments into some kind of database update function (or whatever is required for the task). A common approach to the first task (e.g. Verbmobil) is to prefer the shortest possible path though a set of fragments i.e. the smallest number of fragments which span the utterance. When a single constituent spans the whole utterance this will be picked since the path is just of length 1. No contextual information is included at this stage. For the second task, there are two common approaches. The first is to translate the fragments independently into database update functions. The second is to apply various reconstruction rules (working on either syntactic or semantic fragments) to try to fit the pieces into a full sentence (c.f. Verbmobil).

Domain Dependence

Consider the Following Sentence in the Air Traffic Domain:

Show flights to Boston

This has two readings, one where "flights to Boston" is a constituent, the other where "to Boston" is an adverbial modifier (similar to "to Fred" in "Show flights to Fred").

A shallow system may well have rules for "flights to <city>", but is unlikely to include rules for the adverbial reading. Thus the possibility of ambiguity does not exist. Despite there being no explicit domain training, the correct reading is picked.

In contrast, in a deep analysis system with a general purpose grammar, there has to be specific customization to the domain. This may be via specialization of the grammar to the domain (c.f. OVIS), or via the introduction of domain specific preference mechanisms. For example, the SL T system uses 'treebanking' (Carter 1997) which involves a human picking correct analyses in order for the machine to learn domain specific syntactic and semantic triples which select between alternative readings.

Other examples may be problematic for shallow systems which employ domain independent chunking. For example, consider the following interchange:

Please give me your departure and destination cities
Boston London Heathrow

The correct bracketing here requires the use of domain specific information that "London Heathrow" can be treated as a unit. To use this information we either need to incorporate a domain specific pre-processing stage which picks out idiomatic expressions, or preserve alternative bracketings until later domain specific processing.

Finally we should note that domain dependence (and context dependence as we shall discuss below) should not just be used for choosing between readings given by full parses of the utterance, but should affect which fragments are picked. Sometimes this will mean that a fragment interpretation should be chosen instead of a full interpretation. For example, a relatively common problem with the current SL T system is where the recognizer suggests an extra word at the end of an utterance. A full analysis can often be found which incorrectly incorporates the bogus word, and this is picked in preference to a correct fragment analysis.

Context Dependence: Previous Utterance

Shallow systems typically incorporate preferences arising from the preceding question. This is used to ensure that the answer "Boston" in the context of the question "Where do you want to go" is interpreted differently from in the context of "Where do you want to leave from". In deep systems the need for context dependent preferences is not so immediately obvious, since examples such as these can be treated using some variety of ellipsis resolution where the utterance is first translated into something equivalent to "I want to go to Boston". This however breaks down in cases where there is a full sentence reply. Consider the following example (which occurred in the SL T system). The interchange is as follows:

S: Where would you like to go?
U: I would like to go to/from Boston

The speech recognizer fails to distinguish between to/from, and domain specific preferences happen to very slightly prefer "from" vs. "to" in this context. The system thus decides (incorrectly) that the most likely sentence is "I would like to go from Boston". The correct analysis has now been ruled out, and the dialogue manager cannot recover the correct interpretation.

How can this be changed? There are two options. The first is to bring contextual information to bear much earlier in the process (this is effectively what is happening in the shallow approaches). The second is to ensure all analyses survive until a late stage, where context then comes into play. In the SL T system domain specific preferences could be context specific as well, though this would entail a larger treebanking stage. In OVIS there has already been some experimentation with bringing in context early in the process and weighting fragments accordingly.

Context Dependence: Other Parts of the Utterance

Consider the following examples:

I'd like to leave York, now let's see, yes, at 3 pm
at 3 pm=>departure-time(3 pm)
I'd like to arrive at York, now let's see, yes, at 3 pm
at 3 pm=>arrival-time(3 pm)

The translation of the phrase "at 3 pm" is dependent here not on any outside context but on the rest of the utterance. This is relatively easy to cope with in a shallow processing system which works on a single analysis at a time. We merely need patterns of the form:

| [leave] | [at 3pm]/time(3pm) => departure-time = 3pm |
| [arrive] | [at 3pm]/time(3pm) => arrival-time = 3pm |

There is no a priori reason to suggest that we could not apply similar context dependent rules within a deep approach, although it might be necessary to apply incomplete heuristics to avoid the inefficiency caused by fragments not being able to be translated independently.

Reconfigurability

It is sometimes argued that deep approaches are more easily reconfigurable since there is more reuse of standard processing modules (e.g. parsing, morphology and semantic construction). Shallow processing systems tend to be more task directed, so we might expect a greater proportion of the code to need changing. However in practice this argument only tends to apply when there is a change of task (e.g. enquiries regarding routes vs. prices), but no change of domain (e.g. computer manuals vs. airline booking). When moving to a new domain a deep approach has more work to do since it doesn't just have to deal with words or phrases of particular interest to the task, but all new words and constructions found in the domain.

Where shallow systems tend to be more problematic is when we try to improve coverage. Many systems rely on precisely ordered pattern matching rules. Adding a rule or changing the order for one phenomenon often causes another to break. This is not unlike trying to maintain a large set of grammar rules in a deep analysis system.

Accuracy

The final issue to consider is the accuracy of analyses produced by shallow or deep systems. A feature of most shallow systems is that they are goal directed. Similar to Information Extraction (IE) Systems, they only look for the information they need and ignore the rest. Let us look at an example from IE first, where the issues are particularly clear. A standard task in IE is to look for relationships between people and companies e.g. "who is chairman of which company". Consider the following sentence:

John Smith, Director of ABC Corp., announced today that his four task force managers had increased profits in three divisions.

From this we can infer that John Smith is Director of ABC Corp. without unpacking all the readings for the sentence as a whole. This is a valid inference to make since the sentence can be rephrased as the following conjunction.

It is safe to infer "A" from "A and B" even if "B" is ambiguous.

Another standard abstraction made in IE is to ignore adjectives or other noun modifiers and just look at the head noun. For example, a system might extract "ABC Corp. made a profit" from all three sentences below, although it is only safe to do so from the first:

ABC Corp. announced a pre-tax profit of $4000 dollars

ABC Corp. falsely announced a pre-tax profit of $4000 dollars

ABC Corp. announced a false pre-tax profit of $4000 dollars

Dialogue is a bit different since we don't usually have to wade through immense quantities of irrelevant text. However, there are plenty of cases where information is supplied which there is no need to process. For example in the flight booking domain we get cases such as:

I would like a comfortable flight to Boston because my sister

Here again we can ignore the reason, and the modifier, "comfortable", to extract the relevant request of "I would like a flight to Boston".

There are also similar cases in dialogue where it is not safe to ignore surrounding material e.g. it is safe to use shallow processing to pick out "destination=Boston" in the first example below, but not the second I would like to go to Boston Now let me see, not to Boston, but perhaps to Chicago How can we deal with this kind of negative information? The first option is just to ignore it. Negation (implicit or explicit) and non-intersective modification is not that common in newspaper texts or in many dialogue scenarios, so the correct inferences will normally go through. However, this means we are unnecessarily throwing away useful information. The second option is to perform some checking of the monotonicity properties of the context e.g. by checking there is no 'not' with the potential to have scope over the material of interest. The third option is to move closer to deep processing, since part of the job of full parsing is to determine constituency, hence scoping, and the job of a grammar to provide useful generalizations using the recursive structure of a language.

SUMMARY

What conclusions can we make from the discussion above? Firstly, the shallow processing paradigm does have theoretical justification. In shallow processing you make (defeasible) inferences using partial information about the utterance content. This is similar to how Oaksford and Chater (1991) argue that humans generally have to behave: we often have to make defeasible inferences from partial information. Even if we know what utterance was made we may not know whether it was made sarcastically or not. At some stage we have to jump to a conclusion, although this may be subject to later retraction.

Secondly, although shallow systems are good at dealing with partial information, in some cases (e.g. the discussion of negation in the last section), the information they use may be more partial than it needs to be. Where we can correctly ascertain constituency (and hence scope) we should do so.

An Approach Using Flat Structures

Choice of Flat Structure

Shallow approaches seem to gain by concentrating on information which is of interest to a specific task. To be able to do this in a deeper approach it is useful to use a representation which splits information up as much as possible. Here we will use a basic flat structure as described in the section entitled "Introduction to Flat Structure," above, but make two extensions. The first is to allow for the same index to be used more than once, and to treat such cases as alternative readings (i.e. meta-level disjunction). For example, we take i4:P i4:Q to mean i4 has the two readings, P and Q1. We will also allow the same index to appear in more than one argument position (for example, the following would be a valid set of constraints: {i4:(i1,i2), i4(i1,i3)}). These two extensions give us the ability to pack ambiguous readings in a similar manner to a chart, and to structure share similar to a chart or packed parse forest.

Building a Flat Structure

The extensions made above give us something akin to a 'semantic' chart, and allow flat semantic representation to be created directly during parsing for both fragments and full constituents. The choice to give indices names such as i1, i2 etc. was arbitrary, so we can equally well choose to name them e.g. O-I-np (corresponding to a np edge between positions 0 and I) or 1-2-vp (corresponding to a vp edge between positions I and 2). We merely have to ensure that if indices are used more than once, then their interpretation corresponds to the choices made above. This will be the case if we choose chart edges with the appropriate syntactic information and have a close syntax-semantics mapping. Semantics thus becomes a further annotation on the chart. Consider the syntactic chart which might be created for the sentence "US20S leave Boston":

O-I-np: US20S 1-2-vtr: leave 2-3-np: Boston 1-3-vp: [1-2-vtr,2-3-np] 0-3-s: [0-I-np,I-3-vp]

By further annotating the edges we can produce a corresponding 'semantic' chart i.e.

O-I-np: us20S 1-2-vtr: leave 2-3-np: Boston 0-3-s: 1-2-vtr(0-I-np,2-3-np)

The edge left out is the vp edge. We'll choose to treat the semantics of the vp in a slightly unconventional way, similar to the semantics for the sentence, but with a non existing np index i.e.

1-3-vp: 1-2-vtr(1-1-np,2-3-np)

Similarly, assuming a bottom-up, left-corner or incremental parsing strategy, the fragment "leaves Boston" would get the semantic chart:

0-1-vtr: leave 1-2-np: Boston 0-2-vp: 0-1-vtr(0-0-np, 1-2-np)

We can think of the vp semantics as a combination of the vp with an unknown empty np. This seems to work well: we cannot infer anything about the subject of the verb but we retrain the correct relationship between the verb and its object (allowing, for example, a rule to infer that "Boston" is the departure city).

Note that although the positions used here i.e. 0,1,2,3 correspond to word counts, we can just as easily use positions corresponding to time intervals, building the semantic chart directly on top of a word lattice, as is done in Verbmobil (Worm 1999), where chart edges are similarly annotated with semantic material.

Applying Rules to a Semantic chart

What Kind of Rules Might We Apply?

Despite the equivalence between basic flat structures and corresponding logical forms, the different representations suggest rather different translation rules. Reconsider the example we had before of a pattern matching rule to interpret "at 3 pm" in the context of leaving:

[leave] [at 3 pm]/time(3 pm)=>departure-time=3 pm

This rule assumes some prior application of rules which determine sortal information i.e. that "at 3 pm" is a time expression.

Now consider the chart/lattice we might get for the utterance "I leave at 3 pm":

0-1-np:I 1-2-vintr: leave 0-2-s: 1-2-vintr(0-1-np) 2-3-p: at 3-4-np: 3 pm 2-4-pp: 2-3-p(2-2-s,3-4-np) 0-4-s: 2-3-p(0-2-s,3-4-np)

Here we have three larger edges, the first corresponding to "I leave", the second being the pp corresponding to "at 3 pm", the third corresponding to the whole sentence "I leave at 3 pm".

The semantics for "at" takes the sentence as the first argument, the time as the second. The pp arc, similar to the vp arc in the previous example includes a null first argument.

Before advocating a particular approach, let us consider more generally the kind of rules which can be applied to a semantic chart. For example, a specific rule, requiring a connected semantics for the verb phrase might be as follows (the capitalized letters stand for variables):

If we find a preposition "at" and this immediately dominates the verb "leave" then departure-time is the second argument of "at" i.e.

I: J(K,L) & J:at & K: M(N) & M:leave & L:T

=> departure-time=T

This rule is probably too specific, so we may want to loosen it to allow for e.g. other modifiers between the verb and the "at" phrase i.e.

If we find a preposition "at" and this dominates the verb "leave" then departure-time is the second argument of "at" i.e.

I: J(K,L) & J:at & K>H & H: M(N) & M:leave & L:T

=> departure-time=T

Weakening this again we might get rid of the dominance restriction. We then have:

If we find a preposition "at" and a verb "leave" then departure-time is the second argument of "at" i.e.

I: J(K,L) & J:at & M:leave & L:T

=> departure-time=T

This final rule is actually weaker than the pattern matching rule allowing "leave" to appear before or after "at", and there is also no check that the argument to "at" is of sort "time". We may want to strengthen the rule with at least a sortal check i.e.

I: J(K,L) & J:at & M:leave & L:T & time(T)

=> departure-time=T

We now have suggested several rules, the first being closest to a full semantics approach, the bottom closest to a pattern matching approach. Is one of these the correct rule?

The top rule is the most restrictive, requiring a fully connected verb phrase. The final rule is the least restrictive and thereby the most robust when encountering fragmentary input. However it is also the most likely to go wrong. For example, it would provide "departure-time=3 pm" from the sentence I would like to leave Cambridge and arrive at 3 pm The rule thus only makes sense in the context of other rules which can override it., e.g. a more specific "arrival-time" rule which worked on the verb phrase "arrive at 3 pm". In pattern matching systems this would typically done via temporal ordering: more specific rules are applied first and block weaker rules from applying.

This discussion suggests that no one rule should be chosen. Instead we need a range of rules for "departure-time" and "arrival-time" some of which are more specific than others. In a particular scenario we should pick the most specific rule which can apply.

To compact up the rules, the approach taken here is to provide a set of obligatory constraints, and some optional constraints. The four rules above are compacted into the single rule:

Obligatory constraints: {I: J(K,L), J:at, M:leave, L:T, time(T)}
Optional constraints: {K>H, H: M(N), K: M(N)}
=>
departure-time=T A particular application of a rule will get a weight according to the number of obligatory and optional constraints which hold.

Inference, Underspecification and Translation

The rules above are expressed as inference rules i.e. "if we have A and B then we can infer C". This suggests that getting the value for a slot is a process of inference from a semantic representation which may be underspecified (the rules do not check that the representation is fully specified). The inference is also defeasible, since there is no checking of the monotonicity properties of the surrounding context, and various assumptions are missing. Another way to think about this is in terms of Abduction (c.f. Hobbs et al. 1993) An inference could go through if we added in various extra constraints, and we want to add in as few extra constraints as possible (hence more specific rules are preferred). Note that this is a nonstandard use of Abductive Reasoning since we are allowing abduction of information not just about the context etc. but also about the actual structure or content of the utterance.

A defeasible inference perspective works well when we consider single slot values. However, when we consider multiple values, or items in the scope of other operators, it is useful to think in terms of translation. The idea of treating database enquiry as translation goes back to at least Bronneberg et al. (1980), and the use of inference for translation into database slots was advocated by Rayner (1993). Taking a translation approach, we can consider translating individual pieces of the utterance, and then put the pieces back together again. This should allow better generalization. It also gives us a better story as to why a more specific rule for e.g. arrival time would block a less specific rule for departure time (even if higher weighted, or applied earlier). Once a term has been translated, it will not be available for translation using another rule. To rephrase the rules above as translation rules we have to distinguish between items to be translated and the surrounding context. For example, the departure-time rule would become:

Constraints for translated terms: {time(T), J:at, L:T, I:J (K,L)}
Constraints for rest of utterance: {M:leave}
Optional constraints: {K>H, H: M(N), K: M(N)}
New constraints: {P: translation({J,L},Q), Q:departure-time=T}

Here the two indexed items, J and L (corresponding to the word "at" and the time) are translated to the term Q which is a statement that the departure time has the value T. Other items such as the M (corresponding to the word "leave") are constraints on the rule, but are not part of the translation.

Now consider an example containing a negation e.g.

Not to London on Thursday, to Manchester on Friday

The negation can be translated separately e.g.

Constraints for translated terms: {I:J(K,L), J:not}
Constraints for rest of utterance: { }
Optional constraints: { }
New constraint: {R: in-order(-M, +N), P:translation(K, M),
Q:translation(L,N)}

This states that there is a translation of "not" as a database command which first checks that the constraint corresponding to M does not hold, then asserts the constraint corresponding to N (note that this is just one of the many possible translations of "not"; alternative translations are required for "not via London", or "not Boston, London").

This rule is appropriate if the material dominated by the "not" has a connected parse, with the immediately dominated material having a translation. We can weaken this to allow dominance rather than immediate dominance or back-off further e.g. to allow the first argument of "not" to be anything up to the next comma.

How does this translation approach differ from the defeasible inference approach? In this approach we translate all the terms we think are important, and assume that all other terms are semantically empty (null constraints or identity functions). It is this assumption that is defeasible, along with relaxations allowed within the rules.

For completeness, it should be mentioned that it would be possible to allow rules which access the values of translated subconstituents i.e. a rule may fire if subconstituents have appropriate translations. This however does introduce rule order dependence: we would have something very similar to cascaded pattern matching, where first items are annotated as e.g. companies and losses, then a rule picks up the companies and losses to annotate the sentence as a whole as a company loss.

Finally we should note that things get more complex when we consider alternative readings for the same section of utterance (which of course is the normal state of affairs when we start with a speech lattice). In this case we cannot be sure of the surrounding context, and we do not want translations of different parts of the utterance to depend upon different readings of the context. This means that assumptions need to be preserved (e.g. the contextual constraints above), and if there are cascaded rules, the assumed constraints need to filter into the result (in logical terms this is just a case of A–>B and B–>C then A–>C). We will consider one possible architecture at the end of this paper, but this is by no means the only possibility.

Translation Rules for a Semantic Chart

The final change we need to make to the rules is to allow for the effect of the context of the previous utterance, and the dialogue contribution so far (e.g. what slots have already been filled etc.). The translation rules are thus partly dealing with semantic information, partly with what might traditionally be treated as pragmatic information. An example translation rule is the following:

Constraints for translated terms: {time(T), J:at, L:T, I:J (K,L)}
Constraints for rest of utterance: { }
Constraints from prior utterance: {M:query(departure-time)}
Contextual slot values:

Optional constraints: { }

New constraints: {P: translation({J,L},Q), Q:departure-time=T}

This is appropriate for picking out the departure time where the question asked what the departure time was, and the answer contains a time. This rule will fire provided there is no more specific rule to translate the terms to something else.

Now let us reconsider the various requirements we had earlier and see how this approach fits.

Evaluation of the Flat Structure Approach

Robustness

The approach outlined above has most similarity in dealing with fragmentary input to pattern matching approaches. There is no need to try to reconstruct a full semantic analysis; instead a weaker version of the translation rule is used (with fewer optional constraints applying). Where there is ambiguity, more specific rules are preferred.

Domain Dependence

Domain dependence is built into the translations rules, rather than there being any particular filtering stage based on domain specific preferences. Different readings are preserved until the translation rules fire. Although a sentence such as "Show flights to Boston" will get two readings, there is no need to choose between them. The translation rules (similar to pattern matching rules) will only pick up on the appropriate possibility. More empirical research is required to see if this will work in all cases, or whether there might sometimes be a role for domain specific preferences to adjust the weightings given to different components.

The preservation of different readings until translation allows correct treatment of the "Boston London Heathrow" case. Finally, we should note that there is no a priori preference for longest fragments or the shortest path through the chart. Preference is given to more specific instantiations of rules. Larger fragments may well result in more optional constraints being satisfied. However this will only be if the larger fragment introduces more material which is relevant to the task: the addition of a bogus word will not be rewarded. Moreover, specificity gained in this way still has to be balanced against specificity gained from contextual constraints.

Context Dependence: Previous Utterance

Contextual dependence is included by adding constraints to the translation rules. This can comprise constraints on the previous utterance (e.g. which slots are being queried), or on the current dialogue state. In simple task oriented dialogues the state is likely to be just a set of slots, some of which are filled. Contextual constraints count towards making the rule more specific, though to a lesser extent than information within the utterance itself. The aim is for the top down expectation provided by contextual constraints to be able to affect the interpretation without overriding what the utterance actually says.

Context Dependence: Other parts of the utterance

The approach here is similar to shallow processing in allowing the translation of one part of an utterance to be affected by the translation of other parts.

Reconfigurability

Reconfiguring to a new task requires the introduction of new translation rules, and the addition of lexical entries for at least the words mentioned in the translation rules. The robust nature of the approach means that we can provide a working system without providing a full parse for all, or even for a majority of the utterances in the domain.

Accuracy

The aim of this approach was to give the robustness you might expect from shallow approaches, but use as much linguistic information as available to ensure accuracy is as good as possible. The use of rules which can be more or less specific should achieve this. Where parsing provides appropriate constituency (and hence appropriate scope for operators such as "not") this information is used. Where not, the relaxed versions of the rules should at least equal the results of shallow processing.

A preliminary implementation

The system implementing the concepts of this section allows for simple question answer dialogues such as the following:

S: Where would you like to go?
U: London
S: Where are you leaving from?
U: Cambridge
S: Would you like the quickest or the shortest route?
U: shortest
S: When would you like to arrive?
U: Before five p m.

However, it also allows for a user to supply more information than expected or different information. For example, the following exchange is more appropriate for an experienced user of the system:

S: Where do you want to go?
U: I would like the shortest route from Cambridge to London to arrive before 5

The system builds a chart using a fully incremental parser based which adds new edges or annotations to extend a word lattice, Categorial Grammar was used to give a straightforward syntax/semantics interface, and the grammar was subsequently compiled into simple Dependency Grammar. This enabled the use of a packed parser based on the packed incremental recognizer described by Milward (1994).

The present algorithm applies each translation rule to the chart, and picks up a set of potential slot-value pairs (for the slots, destination, source, mode, and arrival/departure time). Each slot-value pair is weighted according to the specificity of the rule used. The weighting is pretty crude, and achieved by adding the number of items mentioned in a rule, with higher weightings for closer items. More advanced weighting schemes based on Information Retrieval technology (where more interesting terms get higher weights) can be imagined. When spoken input is used we would also want to use the recognizer weightings.

After creating the set of potential slot-values, the algorithm then filters the set to obtain a consistent set of slot-value pairs. The first stage is to filter out any cases where the translated material overlaps. In these cases the more specific translation is retained, the others are dropped. Secondly there is a check to ensure that no slot is given the same value twice. If there is a conflict the higher weighted value is adopted.

It should be noted that the current algorithm does not check consistency of contextual constraints: different assumptions about the context may have been made during the filling of different slot values, and ideally the algorithm should check that each translation corresponds to a consistent path through the lattice. Despite this, the ability of the rules to deal with context and domain dependency, and to provide robust interpretation provide very good system performance.

Conclusions

This work points to various ways in which we can mix some of the advantages of linguistic analysis with shallower methods. The approach advocated incorporates linguistic information where necessary (e.g. for determining the scope of negation), but also allows linguistic constraints to be relaxed to ensure robustness.

While the present invention has been described in terms of several preferred embodiments, there are many alterations, permutations, and equivalents that may fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for linguistic pattern recognition of information, comprising the steps of:
   (a) retrieving textual information from a data source utilizing a network;
   (b) segmenting the textual information into a plurality of phrases;
   (c) scanning each phrase for patterns of interest;
   (d) building a corresponding event structure for each pattern of interest found; and
   (e) merging event structures that provide information about essentially the same incident, wherein the merged event structures are stored in an information cache based on concept-based storage for later retrieval based on concept.

2. A method as recited in claim 1, wherein at least one phrase Includes a noun group.

3. A method as recited in claim 1, wherein the phrase includes a verb group.

4. A method as recited in claim 1, further comprising the operation of providing a user interface, the user interface allowing a user to provide a search request for determining the pattern of interest.

5. A computer program embodied on a computer readable medium for incorporating concept-based retrieval within Boolean search engines, the computer program comprising:
   (a) a code segment that retrieves textual information from a data source utilizing a network;
   (b) a code segment that segments the textual information into a plurality of phrases;
   (c) a code segment that scans each phrase for patterns of interest;
   (d) a code segment that builds a corresponding event structure for each pattern of interest found; and
   (e) a code segment that merges event structures that provide information about essentially the same incident, wherein the merged event structures are stored in an information cache based on concept-based storage for later retrieval based on concept.

6. A computer program as recited in claim 5, wherein at least one phrase includes a noun group.

7. A computer program as recited in claim 5, wherein the phrase includes a verb group.

8. A computer program as recited in claim 5, further comprising a code segment that provides a user interface, the user interface allowing a user to provide a search request for determining the pattern of interest.

9. A system for incorporating concept-based retrieval within Boolean search engines, the system comprising:
   (a) logic that retrieves textual information from a data source utilizing a network;
   (b) logic that segments the textual information into a plurality of phrases;
   (c) logic that scans each phrase for patterns of interest;
   (d) logic that builds a corresponding event structure for each pattern of interest found; and
   (e) logic that merges event structures that provide information about essentially the same incident, wherein the merged event structures are stored in an information cache based on concept-based storage for later retrieval based on concept.

10. A system as recited in claim 9, wherein at least one phrase includes a noun group.

11. A system as recited in claim 9, wherein the phrase includes a verb group.

12. A system as recited in claim 9, further comprising logic that provides a user interface, the user interface allowing a user to provide a search request for determining the pattern of interest.

* * * * *

UNITED STATES PATENT AND TRADEMARK OFFICE
CERTIFICATE OF CORRECTION

PATENT NO.   : 6,745,161 B1
DATED        : June 1, 2004
INVENTOR(S)  : James F. Arnold and Loren L. Voss It is certified that error appears in the above-identified patent and that said Letters Patent is hereby corrected as shown below:

Column 12,
Line 59, please change "each "" is a" to -- each " _____ "is a --

Column 23,
Line 45, please change "{'I'['"']" to -- {'I'}'I'['"'] --.

Signed and Sealed this

Sixteenth Day of November, 2004

JON W. DUDAS
*Director of the United States Patent and Trademark Office*